United States Patent
Suzuki

(12) 
(10) Patent No.: US 10,996,582 B2
(45) Date of Patent: May 4, 2021

(54) IMAGE FORMING APPARATUS

(71) Applicant: CANON KABUSHIKI KAISHA, Tokyo (JP)

(72) Inventor: Takako Suzuki, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/658,930

(22) Filed: Oct. 21, 2019

(65) Prior Publication Data

US 2020/0133169 A1 Apr. 30, 2020

(30) Foreign Application Priority Data

Oct. 25, 2018 (JP) .............................. JP2018-201325

(51) Int. Cl.
| | |
|---|---|
| *G03G 15/04* | (2006.01) |
| *G03G 21/02* | (2006.01) |
| *G03G 15/16* | (2006.01) |
| *G06F 3/12* | (2006.01) |

(52) U.S. Cl.
CPC ....... *G03G 15/04036* (2013.01); *G03G 21/02* (2013.01); *G03G 15/161* (2013.01); *G03G 2221/0005* (2013.01); *G06F 3/1238* (2013.01)

(58) Field of Classification Search
CPC .................. G03G 15/04; G03G 15/011; G03G 15/04036; G03G 21/02; G03G 21/0005; G03G 21/16; G03G 21/1666; G03G 2215/0402; G03G 2221/16; G03G 2221/1636
See application file for complete search history.

(56) References Cited

U.S. PATENT DOCUMENTS

| | | | | |
|---|---|---|---|---|
| 2001/0048823 | A1* | 12/2001 | Nomura ............. | G03G 15/5016 399/80 |
| 2006/0269341 | A1* | 11/2006 | Aoki .................. | G03G 15/5091 400/62 |
| 2010/0196025 | A1* | 8/2010 | Ogura .................... | G03G 15/11 399/43 |
| 2014/0112676 | A1* | 4/2014 | Mori ................ | G03G 15/04045 399/49 |

FOREIGN PATENT DOCUMENTS

| | | |
|---|---|---|
| JP | 2014-081584 A | 5/2014 |
| JP | 2016-31467 A | 3/2016 |
| JP | 2010-180002 A | 8/2020 |

* cited by examiner

*Primary Examiner* — Thomas S Giampaolo, II

(74) *Attorney, Agent, or Firm* — Canon U.S.A., Inc. I.P. Division

(57) ABSTRACT

An image forming apparatus configured to control the timing of the next cleaning such that, if there is a plurality of image forming jobs and a cumulative number of image-formed recording media is equal to or greater than a set number of sheets for cleaning, an image forming apparatus executes cleaning processing when the plurality of image forming jobs is completed.

9 Claims, 14 Drawing Sheets

IMAGE FORMING APPARATUS

BACKGROUND

Field of the Disclosure

The present disclosure relates to an image forming apparatus that forms an image on a recording medium by using an electrophotographic method, such as an electrophotographic copying machine and a laser beam printer.

Description of the Related Art

Image forming apparatuses using an electrophotographic method conventionally include an optical scanning device that irradiates the surface of a charged photosensitive member with laser light to form an electrostatic latent image. The optical scanning device includes optical system parts such as a light source and a mirror, a casing covering the optical system parts, and an opening for emitting light from the light source to outside the casing. To prevent foreign substances such as toner and dirt from entering the interior of the casing, the opening is closed with a transparent member that transmits the light.

If there are foreign substances such as toner and dirt on the transparent member, the light emitted through the opening can be obstructed by the foreign substances to cause a change in optical characteristics and a drop in the quality of the formed image.

Japanese Patent Application Laid-Open No. 2016-31467 discusses a configuration for performing cleaning processing by moving cleaning members over transparent members in contact with the transparent members to remove foreign substances off the transparent members with the cleaning members. Japanese Patent Application Laid-Open No. 2016-31467 discusses a configuration that performs such cleaning operation on a regular basis, for example, each time image formation is performed on 10,000 sheets.

If a user is executing an image forming job when the number of sheets to perform the regular cleaning processing is reached, the image forming job is suspended to perform the cleaning processing.

SUMMARY

The present disclosure is generally directed to providing an image forming apparatus that will not impair usability even in a case where regular cleaning processing is executed.

According to an aspect of the present disclosure, an image forming apparatus configured to form an image on a recording medium based on an input image forming job includes an image forming unit including a photosensitive member and an optical scanning device. The optical scanning device includes a transparent member configured to allow transmission of laser light, for scanning the photosensitive member, through the transparent member to outside of the optical scanning device. The image forming unit is configured to form the image on the recording medium by developing with toner an electrostatic latent image formed on the photosensitive member by scanning of the laser light and transferring the developed toner image to the recording medium. The image forming apparatus further includes a cleaning mechanism configured to clean the transparent member, and a control unit configured to control the cleaning mechanism such that the cleaning mechanism executes cleaning of the transparent member in response to a predetermined condition being satisfied. The control unit is configured to obtain a cumulative number of image-formed recording media since a cleaning operation was last executed by the cleaning mechanism, and in a case where the cumulative number is equal to or greater than, control the cleaning mechanism to operate after image formation based on the input image forming job is completed.

Further features of the present disclosure will become apparent from the following description of exemplary embodiments with reference to the attached drawings.

DESCRIPTION OF THE EMBODIMENTS

Modes for carrying out the present disclosure will be described below with reference to the drawings. Dimensions, materials, shapes, and relative arrangements of components described below are not intended to limit the scope of the present disclosure thereto unless otherwise specified.

Figure 1:
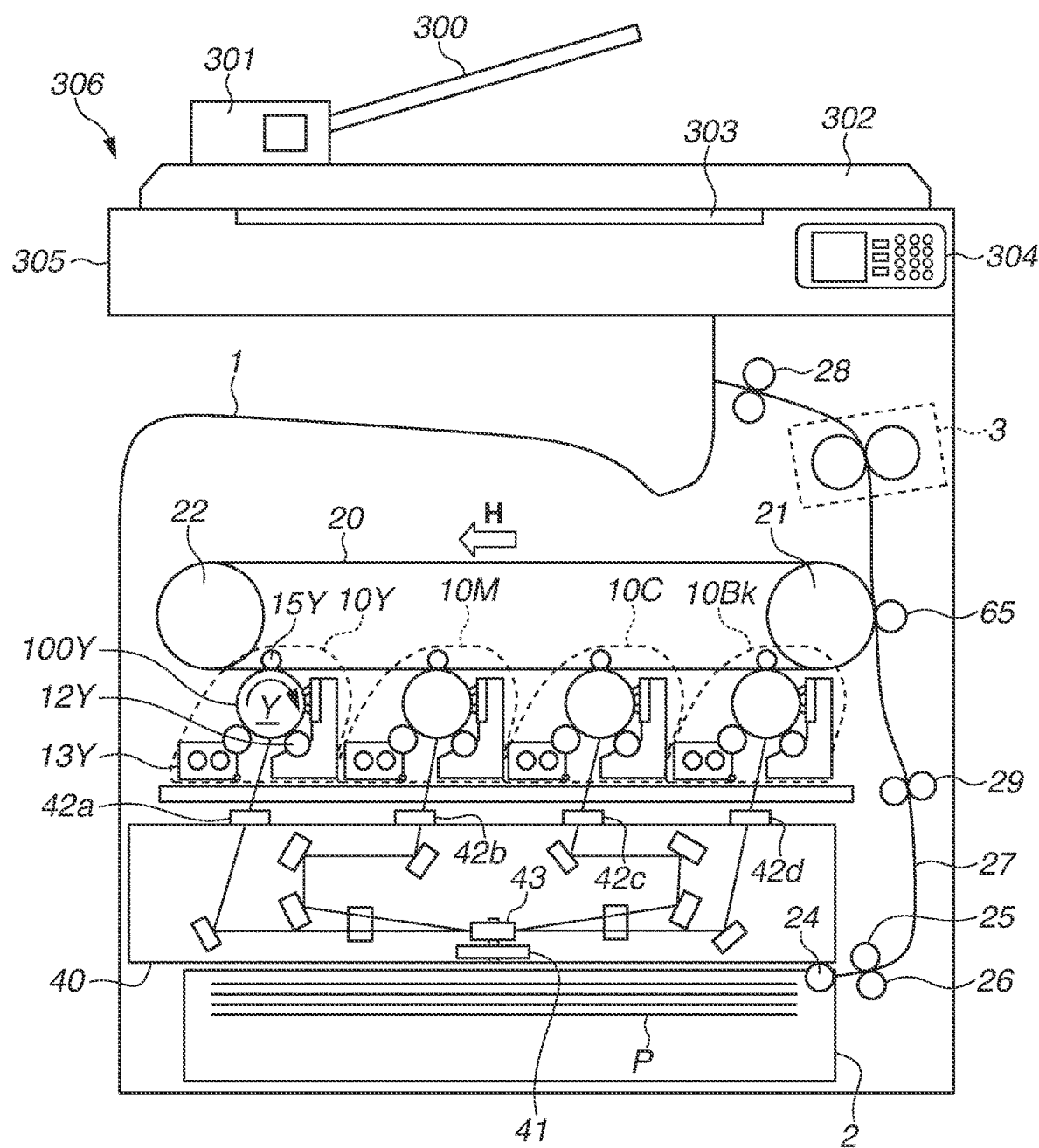
FIG. 1 illustrates a schematic sectional view of an image forming apparatus.

A first exemplary embodiment will be described below. FIG. 1 illustrates a schematic sectional view of an image forming apparatus 1 according to the present exemplary embodiment. As illustrated in FIG. 1, the image forming apparatus 1 according to the present exemplary embodiment is a tandem color laser beam printer including four image forming sections 10Y, 10M, 10C, and 10Bk for forming toner images of yellow (Y), magenta (M), cyan (C), and black (Bk), respectively.

The image forming apparatus 1 according to the present exemplary embodiment includes a reader unit 306 on top of the main body thereof. The reader unit 306 includes a document conveyance device 301 that automatically conveys a document, a document reading device 305 that reads an image of the conveyed document, and a document discharge tray 302 to which the document is discharged.

The document conveyance device 301 includes a document feed tray 300 on which documents are set. The document conveyance device 301 conveys the documents placed on the document feed tray 300 to a document reading position on a glass plate 303 one by one. The document conveyed onto the glass plate 303 is read by a not-illustrated scanner, such as a charge-coupled device (CCD) scanner and a contact image sensor (CIS) scanner, arranged inside the document reading device 305. The document conveyance device 301 then conveys the document further and discharges the document onto the document discharge tray 302.

The document conveyance device 301 is configured to be openable and closable with respect to the document reading device 305. An operator can open the document conveyance device 301 and place a document on the glass plate 303.

The scanner irradiates the document conveyed onto the glass plate 303 by the document conveyance device 301 or the document placed on the glass plate 303 with light from a light source, and converts light reflected from the document and received by a light reception sensor into an electrical signal. Red (r), green (g), and blue (b) components of the converted electrical signal are output to a control unit such as an engine control unit 74 to be described below.

As illustrated in FIG. 1, the image forming apparatus 1 according to the present exemplary embodiment includes an operation unit 304. The operation unit 304 includes a display that displays setting information about print conditions to an operator such as a user and a serviceperson.

The display can display software keys that the operator operates by touching by the finger. The operator can thereby input instruction information about one-sided printing and two-sided printing from the operation panel (operation unit 304).

The operation unit 304 includes a start key to be pressed in starting an image forming operation and a stop key to be pressed in stopping the image forming operation. A numerical keypad includes keys to be pressed in making settings such as a cleaning setting value to be described below. While the start key, stop key, and numerical keypad of the image forming apparatus 1 according to the present exemplary embodiment are hardware keys provided on the operation unit 304, such keys may be displayed on the display as software keys. Various types of data input from the operation unit 304 are stored in a random access memory (RAM) 501 via the CPU.

The image forming apparatus 1 includes an intermediate transfer belt 20 to which toner images formed by the image forming sections 10Y, 10M, 10C, and 10Bk are transferred. The toner images stacked on the intermediate transfer belt 20 by the respective image forming sections 10 are then transferred to a sheet P that is a recording medium, whereby a color image is formed on the sheet P (on the recording medium). The image forming sections 10Y, 10M, 10C, and 10Bk have substantially the same configuration except that the colors of toners used by the respective image forming sections differ from one another. The image forming sections 10 will hereinafter be described by using the image forming section 10Y as an example, and a redundant description about the image forming sections 10M, 10C, and 10Bk will be omitted. In the present exemplary embodiment, a recording medium not only refers to a sheet of paper typically used in printing, but also covers sheet-like recording media such as a sheet of cloth, plastic, and film.

An image forming section 10 includes a photosensitive member 100, a charging roller 12, a developing device 13, and a primary transfer roller 15. The charging roller 12 charges the photosensitive member 100 with a uniform background potential. The developing device 13 serves as a developing unit that develops an electrostatic latent image formed on the photosensitive member 100 by an optical scanning device 40 to be described below to form a toner image. The primary transfer roller 15 transfers the formed toner image to the intermediate transfer belt 20. The primary transfer roller 15 forms a primary transfer portion with the photosensitive member 100 via the intermediate transfer belt 20. The primary transfer roller 15 transfers the toner image formed on the photosensitive member 100 to the intermediate transfer belt 20 when a predetermined transfer voltage is applied thereto.

The intermediate transfer belt 20 is formed in an endless shape, and stretched between a first belt conveyance roller 21 and a second belt conveyance roller 22. The toner images formed on the respective image forming sections 10 are transferred to the intermediate transfer belt 20 as the intermediate transfer belt 20 is operated to rotate in the direction of the arrow H. The four image forming sections 10Y, 10M, 10C, and 10Bk are arranged in parallel below the intermediate transfer belt 20 in a direction perpendicular to a length direction of the intermediate transfer belt 20, and transfer the toner images formed based on pieces of image information of the respective colors to the intermediate transfer belt 20. The image forming sections 10 perform the image forming processes of the respective colors in timing such that a toner image is superposed on an upstream toner image primarily transferred onto the intermediate transfer belt 20. As a result, a four-color toner image is formed on the intermediate transfer belt 20 in a superposed manner.

The first belt conveyance roller 21 and a secondary transfer roller 65 are pressed against each other with the intermediate transfer belt 20 therebetween. A secondary transfer portion for transferring the toner image to the sheet P is formed between the first belt conveyance roller 21 and the secondary transfer roller 65 via the intermediate transfer belt 20. The sheet P is passed through the secondary transfer portion, whereby the toner image is transferred to the sheet P from the intermediate transfer belt 20. Transfer residual toner remaining on the surface of the intermediate transfer belt 20 is collected by a not-illustrated cleaning device.

The image forming sections 10 of the respective colors are arranged in the direction of rotation of the intermediate transfer belt 20 (direction of the arrow H) from the upstream side of the secondary transfer portion in the following order: the image forming section 10Y for forming a yellow toner image, the image forming section 10M for forming a magenta toner image, the image forming section 10C for forming a cyan toner image, and the image forming section 10Bk for forming a black toner image.

The optical scanning device 40 is arranged below the image forming sections 10 in the direction perpendicular to the length direction of the image forming sections 10. The optical scanning device 40 scans the photosensitive members 100 with laser light to form electrostatic latent images on the respective photosensitive members 100 based on the image information about the image to be formed. The image forming sections 10 and the optical scanning device 40 constitute an example of an image forming section.

The optical scanning device 40 includes not-illustrated four semiconductor lasers that emit laser beams modulated based on the pieces of image information of the respective colors. The optical scanning device 40 also includes a motor unit 41 and a rotating polygonal mirror 43. When rotated by the motor unit 41 at high speed, the rotating polygonal mirror 43 deflects the laser beams emitted from the semiconductor lasers to scan along the direction of the rotation axes of the respective photosensitive members 100. The laser beams deflected by the rotating polygonal mirror 43 are guided by optical members arranged inside the optical scanning device 40, and emitted from inside to outside the optical scanning device 40 via transparent members 42a to 42d covering respective openings formed on the top of the optical scanning device 40. The laser beams emitted out of the optical scanning device 40 expose the respective photosensitive members 100.

Sheets P are stored in a feed cassette 2 arranged in a lower part of the image forming apparatus 1. A pickup roller 24 feeds a sheet P to a separation nip portion formed by a feed roller 25 and a retard roller 26. The retard roller 26 is driven to rotate reversely if a plurality of sheets P is fed by the pickup roller 24, whereby the sheets P are conveyed downstream one by one to avoid multiple feeding of sheets P. Each sheet P conveyed by the feed roller 25 and the retard roller 26 is conveyed to a conveyance path 27 extending substantially vertically along a right side surface of the image forming apparatus 1 illustrated in FIG. 1.

The sheet P is conveyed through the conveyance path 27 perpendicularly from the lower side toward the upper side of in a vertical direction of the image forming apparatus 1 and conveyed to a registration roller 29. The registration roller 29 temporarily stops the conveyed sheet P to correct sheet skew. The registration roller 29 then conveys the sheet P to the secondary transfer portion in synchronization with the timing when the toner image formed on the intermediate transfer belt 20 is conveyed to the secondary transfer portion. The sheet P to which the toner image is transferred in the secondary transfer portion is then conveyed to a fixing device 3. The fixing device 3 fixes the toner image to the sheet P by application of heat and pressure. The sheet P to which the toner image is fixed is then discharged by a discharge roller 28 to a discharge tray provided outside the image forming apparatus 1, on top of the main body of the image forming apparatus 1.

If the image forming sections 10 are arranged above the optical scanning device 40 in the main body of the image forming apparatus 1, foreign substances such as toner, paper dust, and dirt can fall on the transparent members 42a to 42d provided on top of the optical scanning device 40 during image forming operations. In such a case, the laser beams emitted toward the photosensitive members 100 via the transparent members 42a to 42d are obstructed by the foreign substances. The foreign substances can cause a change in the optical characteristics and thus a drop in image quality.

Figure 2:
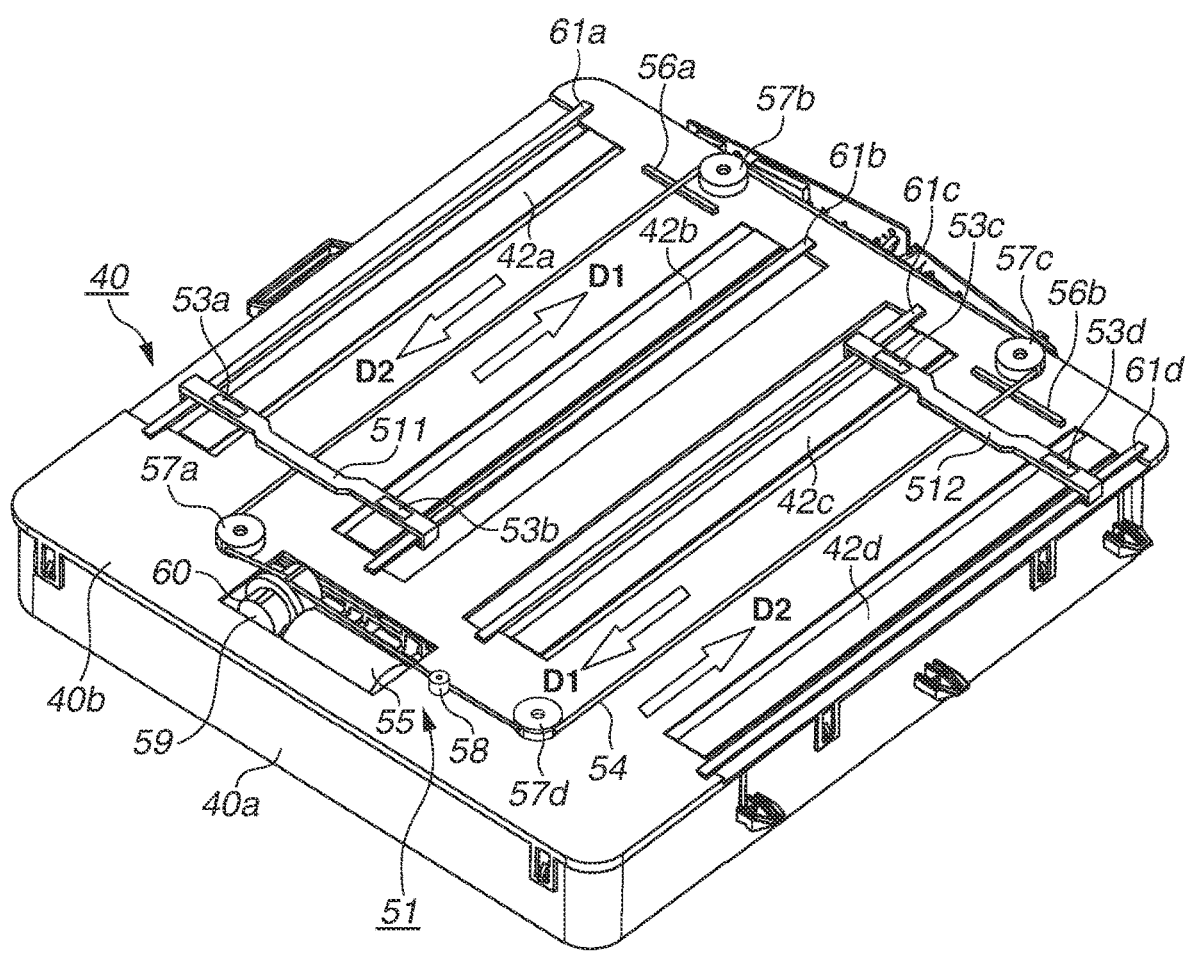
FIG. 2 illustrates a perspective view of an optical scanning device.
Figure 3:
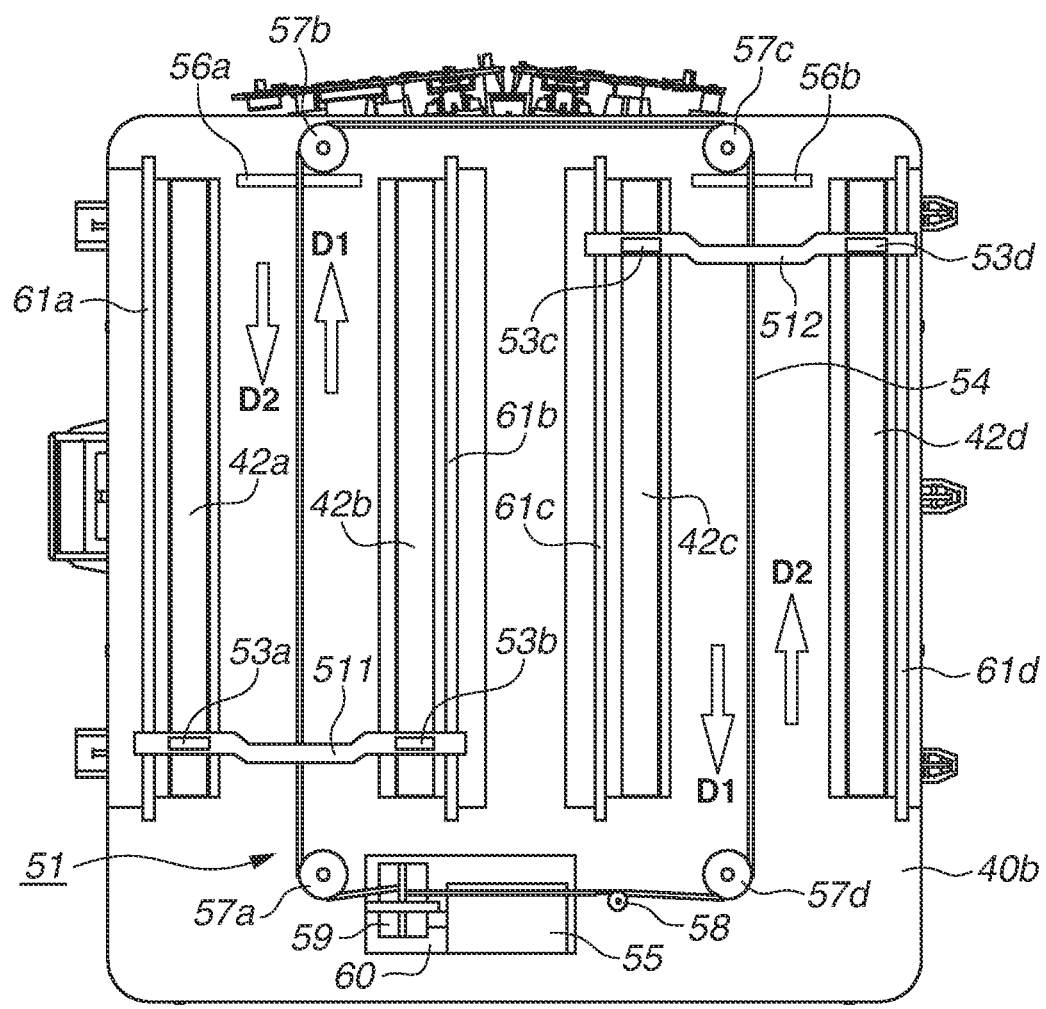
FIG. 3 illustrates a top view of the optical scanning device.

In the present exemplary embodiment, the optical scanning device 40 includes a cleaning mechanism 51 for cleaning the transparent members 42a to 42d. The optical scanning device 40 and the cleaning mechanism 51 included in the optical scanning device 40 are described in detail below. FIG. 2 is a perspective view illustrating the entire optical scanning device 40. FIG. 3 illustrates a top view of the optical scanning device 40.

As illustrated in FIGS. 2 and 3, the optical scanning device 40 includes an accommodation unit 40a and a cover portion 40b. The accommodation unit 40a accommodates the foregoing motor unit 41 and rotating polygonal mirror 43 inside. The cover portion 40b is attached to the accommodation unit 40a and covers the top side of the accommodation unit 40a. The accommodation unit 40a and the cover portion 40b constitute the casing of the optical scanning device 40. The cover portion 40b has four openings for the laser beams to pass through, corresponding to the photosensitive members 100 of the respective colors. The openings each have a rectangular shape extending in the direction of the rotation axes of the respectively corresponding photosensitive members 100, and are formed to extend longitudinally in parallel with each other. The openings are closed by the respective transparent members 42a to 42d each formed in a long rectangular shape. There are four transparent members 42a to 42d like the openings. The transparent members 42a to 42d are attached to the cover portion 40b to extend longitudinally in parallel with each other. The longitudinal direction of the transparent members 42a to 42d is substantially the same as the scanning direction of the laser beams emitted from the optical scanning device 40. In the present exemplary embodiment, the longitudinal direction of the transparent members 42a to 42d is substantially the same as the direction of the rotation axes of the respective photosensitive members 100.

The transparent members 42a to 42d are provided for the purpose of preventing foreign substances such as toner, dirt, and paper dust from entering the interior of the optical scanning device 40, and prevent a drop in image quality due to adhesion of foreign substances to the semiconductor lasers, the mirrors, and the rotating polygonal mirror 43. The transparent members 42a to 42d are made of transparent members such as glass members, and can emit the laser beams emitted from the semiconductor lasers inside the accommodation unit 40a to the photosensitive members 100. In the present exemplary embodiment, the size of the transparent members 42a to 42d is set to be greater than the sizes of the openings so that the transparent members 42a to 42d cover the openings in an overlapping manner. The transparent members 42a to 42d are fixed to the cover portion 40b by adhesively bonding the overlapping portions of the transparent members 42a to 42d to the cover portion 40b.

The optical scanning device 40 is thus covered with the cover portion 40b and the transparent members 42a to 42d so that foreign substances such as toner, paper dust, and dirt will not enter the interior of the optical scanning device 40. The transparent members 42a to 42d greater than the openings in size are adhesively bonded and fixed onto the cover portion 40b, whereby foreign substances such as toner, paper dust, and dirt falling from above the optical scanning device 40 are prevented from entering the interior of the optical scanning device 40 through gaps between the transparent members 42a to 42d and the respective openings.

The present exemplary embodiment includes the cleaning mechanism 51 that performs cleaning processing for cleaning the foreign substances that has fallen on the top surface of the optical scanning device 40 (top surfaces of the transparent members 42a to 42d) from above. The top surfaces of the transparent members 42a to 42d refer to the surfaces on the outer side of the optical scanning device 40, from which the laser beams that pass through the transparent members 42a to 42d are emitted.

The cleaning mechanism 51 is attached onto the cover portion 40b of the optical scanning device 40, on the side opposed to the image forming sections 10. The cleaning mechanism 51 includes cleaning members 53a to 53d, a first cleaning holder 511, and a second cleaning holder 512. The cleaning members 53a to 53d clean the top surfaces of the transparent members 42a to 42d (the surfaces on the outer side of the optical scanning device 40), respectively. The first and second cleaning holders 511 and 512 hold and move the cleaning members 53a to 53d over the transparent members 42a to 42d.

The first and second cleaning holders 511 and 512 lie across two adjoining transparent members 42 each, extend in a direction orthogonal to the extending direction of the transparent members 42, and hold two cleaning members 53 each. The first and second cleaning holders 511 and 512 hold cleaning members 53 equal in number to the transparent members 42.

More specifically, the first cleaning holder 511 is arranged across the transparent members 42a and 42b, and includes the cleaning member 53a for cleaning the top surface of the transparent member 42a and the cleaning member 53b for cleaning the top surface of the transparent member 42b. The second cleaning holder 512 is arranged across the transparent members 42c and 42d, and includes the cleaning member 53c for cleaning the top surface of the transparent member 42c and the cleaning member 53d for cleaning the top surface of the transparent member 42d.

The cleaning members 53a to 53d are made of silicone rubber or unwoven fabric, for example. As the first and second cleaning holders 511 and 512 move, the cleaning member 53a to 53d move in contact with the top surfaces of the transparent members 42. The cleaning members 53a to 53d can thereby remove foreign substances off the transparent members 42 and clean the top surfaces of the transparent members 42.

The first cleaning holder 511 is connected in the middle to a wire 54, and configured to hold the cleaning members 53a and 53b on both end sides with the wire 54 at the center. The second cleaning holder 512 is connected in the middle to the wire 54, and configured to hold the cleaning members 53c and 53d on both end sides with the wire 54 at the center. The wire 54 is stretched to pass through between the transparent members 42a and 42b and between the transparent members 42c and 42d.

The wire 54 is stretched over the cover portion 40b in an annular shape by four stretching pulleys 57a to 57d, a tension adjusting pulley 58, and a winding drum 59 that are rotatably supported on the cover portion 40b. The wire 54 is taken up on the winding drum 59 a predetermined number of turns for length adjustment during assembly of the optical scanning device 40, and in such a state, stretched between the stretching pulleys 57a to 57d. The four stretching pulleys 57a to 57d are arranged so that the wire 54 passes through between the transparent members 42a and 42b and between the transparent members 42c and 42d as described above.

The tension of the wire 54 is adjusted by the tension adjusting pulley 58 provided between the stretching pulleys 57a and 57d. The wire 54 is thus stretched between the stretching pulleys 57, the tension adjusting pulley 58, and the winding drum 59 without a slack. The stretched wire 54 can thus be smoothly run in an annular shape.

In the present exemplary embodiment, the tension adjusting pulley 58 is provided at a position between the stretching pulleys 57a and 57d. However, the tension adjusting pulley 58 is not limited to such a position, and may be arranged at any position as long as the tension of the wire 54 stretched between the stretching pulleys 57a to 57d can be adjusted.

As described above, in the present exemplary embodiment, the cleaning members 53a and 53b are arranged on the first cleaning holder 511, and the cleaning members 53c and 53d are arranged on the second cleaning holder 512. If one cleaning holder holds one cleaning member, as many cleaning holders as the transparent members are needed. This increases the length of the wire to which the cleaning holders are connected. In the present exemplary embodiment, the number of cleaning holders can be reduced and the length of the wire 54 can be reduced, compared to the configuration where one cleaning holder holds one cleaning member. The top surfaces of the transparent members 42a to 42d can thus be cleaned with a simpler configuration.

The winding drum 59 is configured to be rotatable when driven by a winding motor 55 that is a driving unit.

The winding motor 55 is configured to rotate in forward and reverse directions. In the present exemplary embodiment, the forward rotation of the winding motor 55 is in a clockwise (CW) direction, and the reverse rotation a counterclockwise (CCW) direction.

The wire 54 is configured to be taken up on and released from the winding drum 59 as the winding drum 59 is rotated by the rotation of the winding motor 55 in the CW direction or CCW direction. By thus being taken up on and released from the winding drum 59, the wire 54 stretched between the stretching pulleys 57a to 57d can be run annularly over the cover portion 40b.

The first and second cleaning holders 511 and 512 connected to the wire 54 can therefore move in the directions of the arrows D1 and D2 (longitudinal direction of the transparent members 42) as the wire 54 runs. In the present exemplary embodiment, the rotation of the winding motor 55 in the CCW direction moves the first and second cleaning holders 511 and 512 in the direction of the arrow D1. The rotation of the winding motor 55 in the CW direction moves the first and second cleaning holders 511 and 512 in the direction of the arrow D2.

Since the wire 54 is stretched in the annular shape, the movement of the wire 54 moves the first and second cleaning holders 511 and 512 linearly in opposite directions along the longitudinal direction of the transparent members 42a to 42d.

The winding motor 55 and the winding drum 59 are arranged in a recess 60 formed in the top surface of the cover portion 40b. This can reduce the size of the optical scanning device 40 in the height direction. The recess 60 does not communicate with the interior of the optical scanning device 40. The recess 60 is provided so that foreign substances will not enter the interior of the optical scanning device 40 through the recess 60, either.

A first stopper 56a for regulating the movement of the first cleaning holder 511 in the longitudinal direction of the transparent members 42a and 42b (the direction of the rotation axes of the photosensitive members 100) is arranged on the cover portion 40b. A second stopper 56b for regulating the movement of the second cleaning holder 512 in the longitudinal direction of the transparent members 42c and 42d (the direction of the rotation axes of the photosensitive members 100) is also arranged on the cover portion 40b. The first and second stoppers 56a and 56b are examples of abutting members.

The first and second stoppers 56a and 56b are each arranged on one end side of the optical scanning device 40 in the longitudinal direction of the transparent members 42a to 42d. If the first and second cleaning holders 511 and 512 move in the direction of the arrow D1, the first cleaning holder 511 reaches the ends of the transparent members 42a and 42b in the direction of the arrow D1 and comes into contact with the first stopper 56a.

Since the movement of the first cleaning holder 511 in the direction of the arrow D1 is regulated by the first stopper 56a, the load acting on the winding motor 55 rotating the winding drum 59 to run the wire 54 increases. The load is detected by using a current detection unit to be described below, whereby the arrival of the first cleaning holder 511 at the first stopper 56a is detected. Here, the second cleaning holder 512 is located on the opposite side from the first cleaning holder 511 in the longitudinal direction of the transparent members 42.

Now, a series of cleaning processes executed by the movement of the first and second cleaning holders 511 and 512 according to the present exemplary embodiment will be described.

Initially, the winding motor 55 is driven to rotate in the CW direction. The wire 54 is thereby run in the direction of the arrow D2, and the first and second cleaning holders 511 and 512 move in the direction of the arrow D2.

The second cleaning holder 512 then reaches the ends of the transparent members 42c and 42d in the direction of the arrow D2 and comes into contact with the second stopper 56b. Since the movement of the second cleaning holder 512 in the direction of the arrow D2 is regulated by the second stopper 56b, the load acting on the winding motor 55 rotating the winding drum 59 to run the wire 54 increases. The load is detected by the current detection unit to be described below, whereby the arrival of the second cleaning holder 512 at the second stopper 56b is detected.

If the arrival of the second cleaning holder 512 at the second stopper 56b is detected, the rotation of the winding motor 55 is stopped. Here, the first cleaning holder 511 has reached a second position on the other end side in the longitudinal direction of the transparent members 42. Since the rotation of the winding motor 55 is stopped, the movement of the first cleaning holder 511 is stopped at the second position in the longitudinal direction of the transparent members 42.

The winding motor 55 is then rotated in the CCW direction to run the wire 54 in the direction of the arrow D1. This moves both the first and second cleaning holders 511 and 512 in the direction of the arrow D1.

The first cleaning holder 511 then reaches the ends of the transparent members 42a and 42b in the direction of the arrow D1 and comes into contact with the first stopper 56a. Since the movement of the first cleaning holder 511 in the direction of the arrow D1 is regulated by the first stopper 56a, the load acting on the winding motor 55 rotating the winding drum 59 to run the wire 54 increases. The load is detected by using the current detection unit to be described below, whereby the arrival of the first cleaning holder 511 at the first stopper 56a is detected.

If the arrival of the first cleaning holder 511 at the first stopper 56a is detected, the rotation of the winding motor 55 in the CCW direction is stopped, and then the winding motor 55 is rotated in the CW direction by a predetermined amount of rotation. After the wire 54 is thus run by a predetermined distance in the direction of the arrow D2, the rotation of the winding motor 55 is stopped.

In the present exemplary embodiment, that the first and second cleaning holders 511 and 512 make one reciprocating movement over the transparent members 42a and 42b and the transparent members 42c and 42d, respectively, will be referred to as a series of cleaning processes. After a series of cleaning processes is ended, the wire 54 is run by a predetermined distance in the direction of the arrow D2 so that the first cleaning holder 511 stops operation at a position where the first cleaning holder 511 is not in contact with the first stopper 56a and the cleaning members 53 are not in contact with the surfaces of the transparent members 42.

In other words, the first cleaning holder 511 is located in a no-passing area where the laser beams do not pass through the transparent members 42, between the ends of the transparent members 42 in the longitudinal direction of the transparent members 42 and the first stopper 56a. Here, the second cleaning holder 512 stops operation at a position where the second cleaning holder 512 is not in contact with the ends of the transparent members 42 in the longitudinal direction, i.e., in a non-passing area where the laser beams do not pass through the transparent members 42. The stop positions of the first and second cleaning holders 511 and 512 at the end of the series of cleaning processes are cleaning stop positions and cleaning start positions.

In the series of cleaning processes described above, if the second cleaning holder 512 reaches the second stopper 56b, the rotation of the winding motor 55 is stopped and then the winding motor 55 is rotated in the CCW direction. However, the winding motor 55 may be rotated in the CCW direction upon the arrival at the second stopper 56b.

The present exemplary embodiment is configured such that the forward rotation (rotation in the CW direction) of the winding motor 55 runs the wire 54 in the direction of the arrow D2, and the reverse rotation (rotation in the CCW direction) of the winding motor 55 runs the wire 54 in the direction of the arrow D1. However, the wire 54 may be run in the direction of the arrow D1 by the forward rotation of the winding motor 55, and in the direction of the arrow D2 by the reverse rotation of the winding motor 55.

Figure 4:
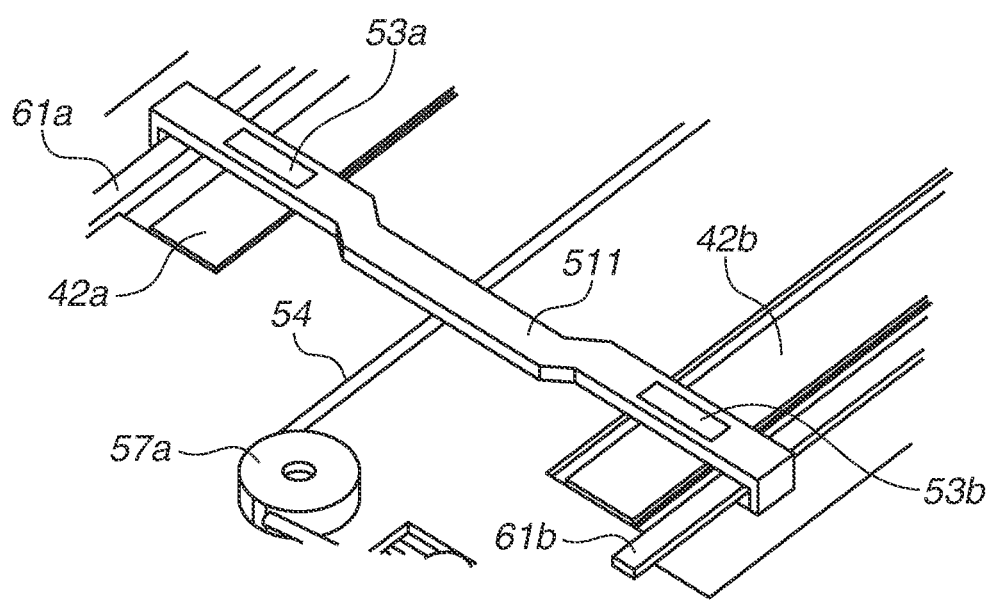
FIG. 4 illustrates a partial perspective view of a first cleaning holder.
Figure 5:
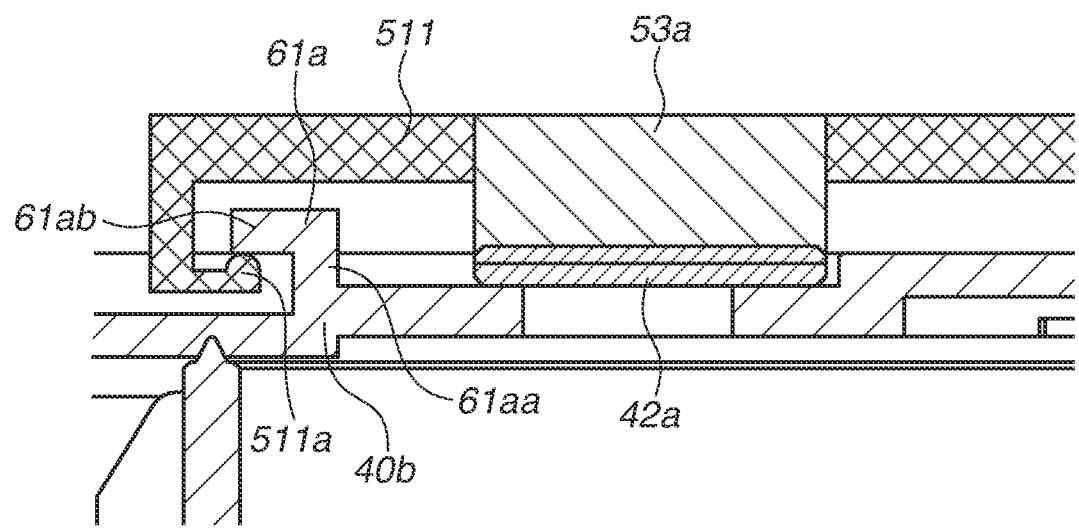
FIG. 5 illustrates a partial sectional view of the first cleaning holder.

The cover portion 40b is provided with guide members 61a to 61d for guiding the movement of the first and second cleaning holders 511 and 512. As illustrated in FIGS. 4 and 5, respective ends of the first cleaning holder 511 are engaged with the guide members 61a and 61b.

FIG. 4 is a partial perspective view illustrating the vicinity of the first cleaning holder 511. Like the first cleaning holder 511, the second cleaning holder 512 is configured such that respective ends of the second cleaning holder 512 are engaged with the guide members 61c and 61d. FIG. 5 is a partial sectional view at the end of the first cleaning holder 511 on the side where the cleaning member 53a is held. While in the present exemplary embodiment the configuration of only the first cleaning holder 511 is described, a similar configuration is applied to the second cleaning holder 512.

As illustrated in FIGS. 4 and 5, the guide members 61a and 61b are integrally formed with the cover portion 40b, and arranged to protrude upward from the top surface of the cover portion 40b.

As illustrated in FIG. 5, the guide member 61a includes a first protrusion 61aa protruding upward from the top surface of the cover portion 40b, and a second protrusion 61ab extending from the first protrusion 61aa in a direction away from the cleaning member 53a.

An end 511a of the first cleaning holder 511 on one end side is formed to get into under the second protrusion 61ab. The end 511a is configured such that the contact portion with the second protrusion 61ab has an arc shape. The arc-shaped end 511a can reduce a sliding resistance when the first cleaning holder 511 moves in the directions of the arrows D1 and D2 (see FIG. 3).

In the present exemplary embodiment, only one end side of the first cleaning holder 511 is described in detail. The guide member 61b on the other end side has a similar configuration. The second cleaning holder 512 also has a similar shape.

The engagement of the first and second cleaning holders 511 and 512 with the guide members 61a to 61d prevents the cleaning members 53a to 53d held by the first and second cleaning holders 511 and 512 from being separated from transparent members 42a to 42d. The first and second cleaning holders 511 and 512 and the guide members 61a to 61d are engaged at positions such that the cleaning members 53a to 53d come into contact with the transparent members 42a to 42d with a predetermined contact pressure.

In the present exemplary embodiment, the guide members 61a to 61d and the first and second stoppers 56a and 56b are integrally formed of resin with the cover portion 40b. However, the guide members 61a to 61d and the first and second stoppers 56a and 56b may be configured as members separate from the cover portion 40b.

As described above, in the present exemplary embodiment, the top surfaces of the transparent members 42a to 42d can be cleaned by moving the first and second cleaning holders 511 and 512 in the directions of the arrows D1 and D2 during cleaning processing. The cleaning processing is executed at arbitrary timing when an instruction to execute the cleaning processing is accepted from the operator via the operation unit 304, and on a regular basis when the cumulative number of image-formed sheets reaches a predetermined number of sheets.

As an initial setting, the predetermined number of sheets to execute regular cleaning processing is set to 2000 in advance. The operator can change the initial setting of the predetermined number of sheets to execute the cleaning processing by inputting, for example, a value corresponding to every 500 sheets via the operation unit 304.

If the cleaning processing is thus executed on a regular basis and the number of image-formed sheets reaches the predetermined number of sheets during execution of an image forming job, the image forming job is suspended and the cleaning mechanism 51 is activated to execute the cleaning processing. Since the image forming job is suspended, the operator executing the image forming job needs to wait for the cleaning process to end. This results in poor usability.

In particular, if the same user is executing a plurality of consecutive jobs, the image forming jobs are suspended and the cleaning processing is executed upon reaching the predetermined number of sheets, which causes an increase in the user's wait time until the end of the plurality of consecutive jobs.

The present exemplary embodiment then employs a configuration in which even if the cleaning processing is executed on a regular basis, the timing to execute the cleaning processing is changed to reduce the operator's wait time based on the image forming jobs.

Figure 6:
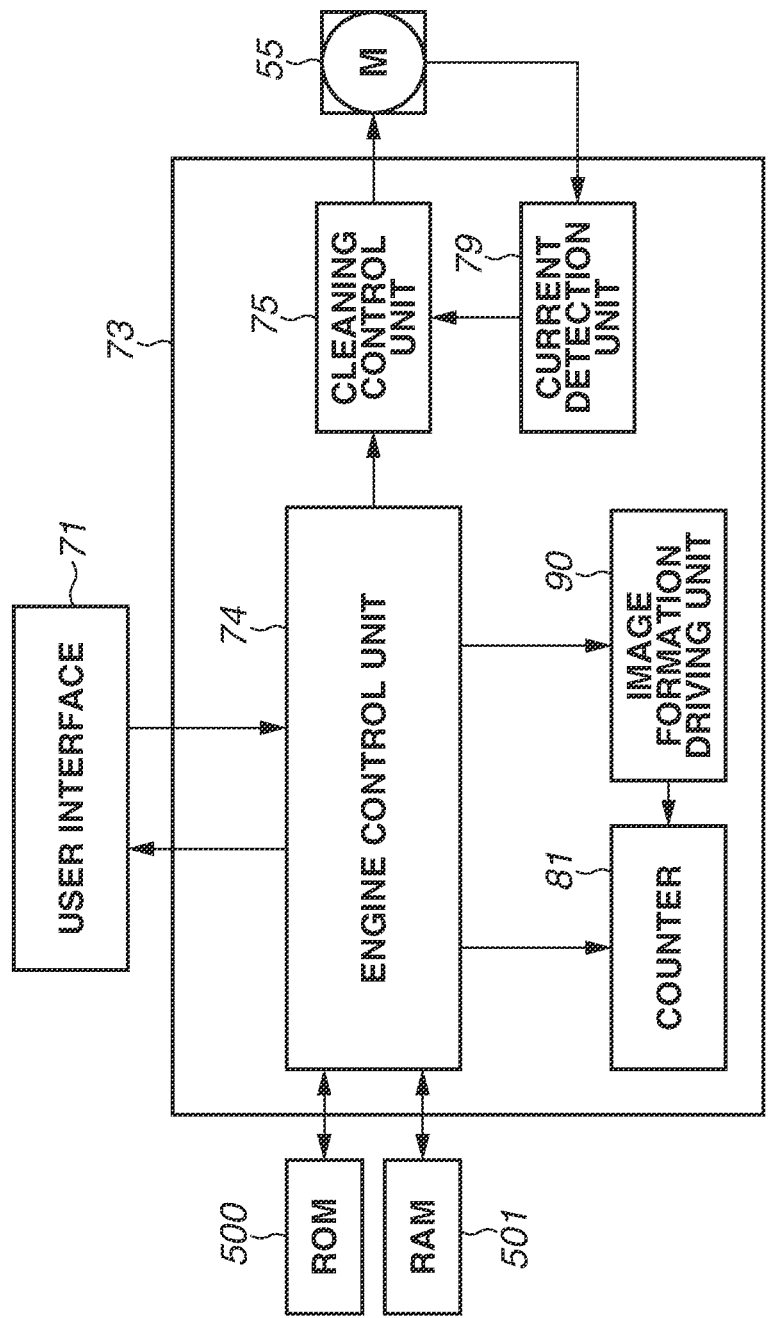
FIG. 6 illustrates a control block diagram according to a first exemplary embodiment.

A cleaning operation during execution of image forming jobs according to the present exemplary embodiment will be described below with reference to FIGS. 6 to 8. FIG. 6 is a control block diagram illustrating a control configuration for performing the cleaning operation during execution of image forming jobs according to the present exemplary embodiment. FIG. 8 is a flowchart illustrating a sequence during the execution of image forming jobs according to the present exemplary embodiment.

As illustrated in FIG. 6, an integrated circuit (IC) controller 73 includes, as its built-in modules, an engine control unit 74, a cleaning control unit 75, a current detection unit 79, an image formation driving unit 90, and a counter 81. The cleaning control unit 75 controls the winding motor 55. The current detection unit 79 detects a driving current of the winding motor 55. The image formation driving unit 90 drives the image forming sections 10 and the intermediate transfer belt 20. The counter 81 counts the cumulative number of image-formed sheets.

The IC controller 73 is configured to control an user interface 71, the winding motor 55, and the image forming sections 10 via the foregoing modules. The controls of the cleaning operation that the IC controller 73 performs by using the modules will be described below.

The IC controller 73 reads a firmware program and a boot program for controlling the firmware program, stored in a read-only memory (ROM) 500, via the engine control unit 74. The IC controller 73 then performs various controls by using the RAM 501 as a work area and a temporary data storage area. The IC controller 73 is an example of a control unit.

The IC controller 73 can obtain setting information about an image forming job from the operator and notifies the operator of various types of information via the user interface 71 that is displayed on the operation unit 304 included in the image forming apparatus 1. For example, the operation unit 304 is constituted by stacking a liquid crystal display panel and a resistive or capacitive touch panel.

The IC controller 73 stores (accumulates) the image forming job accepted from the operator via the user interface 71 into the RAM 501, and executes the image forming job stored in the RAM 501 by controlling the image formation driving unit 90 based on the image forming job in response to a job execution permission from the user. The IC controller 73 also stores an image forming job accepted via a not-illustrated network line into the RAM 501, and executes the image forming job stored in the RAM 501 by controlling the image formation driving unit 90 based on the image forming job. The IC controller 73 can obtain image forming jobs in such a manner. If the IC controller 73 accepts a plurality of image forming jobs via the operation unit 304 and/or the not-illustrated network line, the IC controller 73 stores the image forming jobs in the RAM 501 in the order of acceptance. The IC controller 73 then controls the image formation driving unit 90 to execute the plurality of image forming jobs in succession based on the stored order.

Figure 7A:
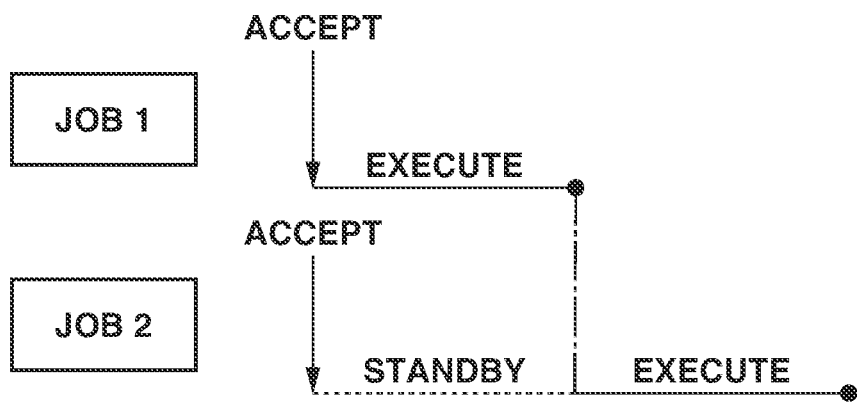
FIGS. 7A, 7B, and 7C illustrate explanatory diagrams of image forming jobs.
Figure 7B:
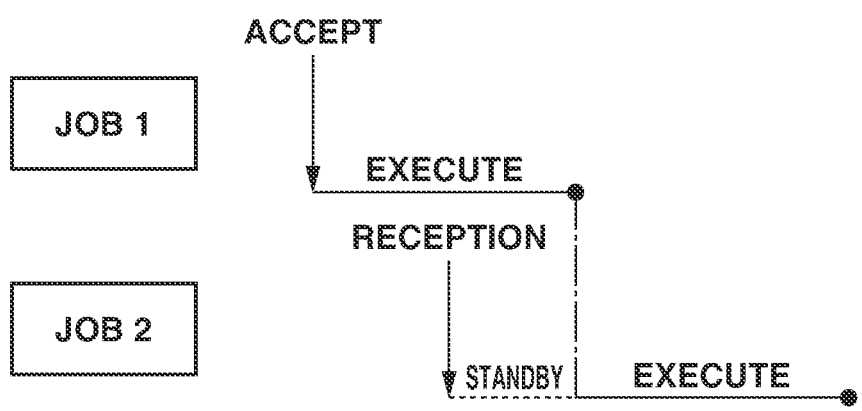
Figure 7C:
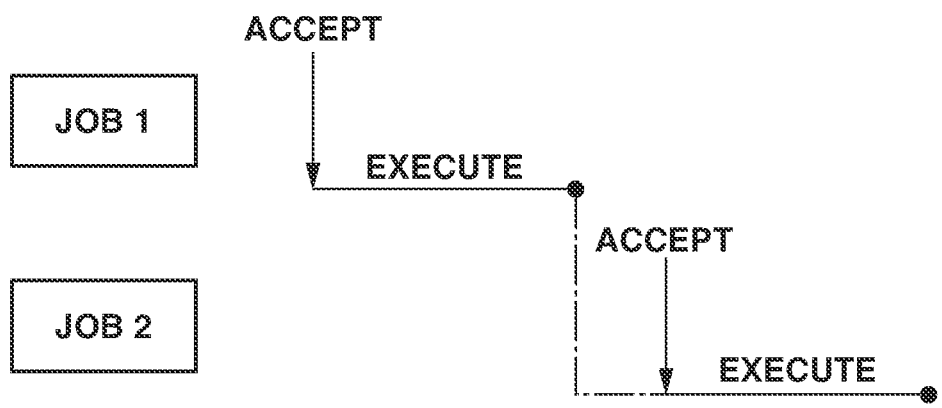
Figure 8:
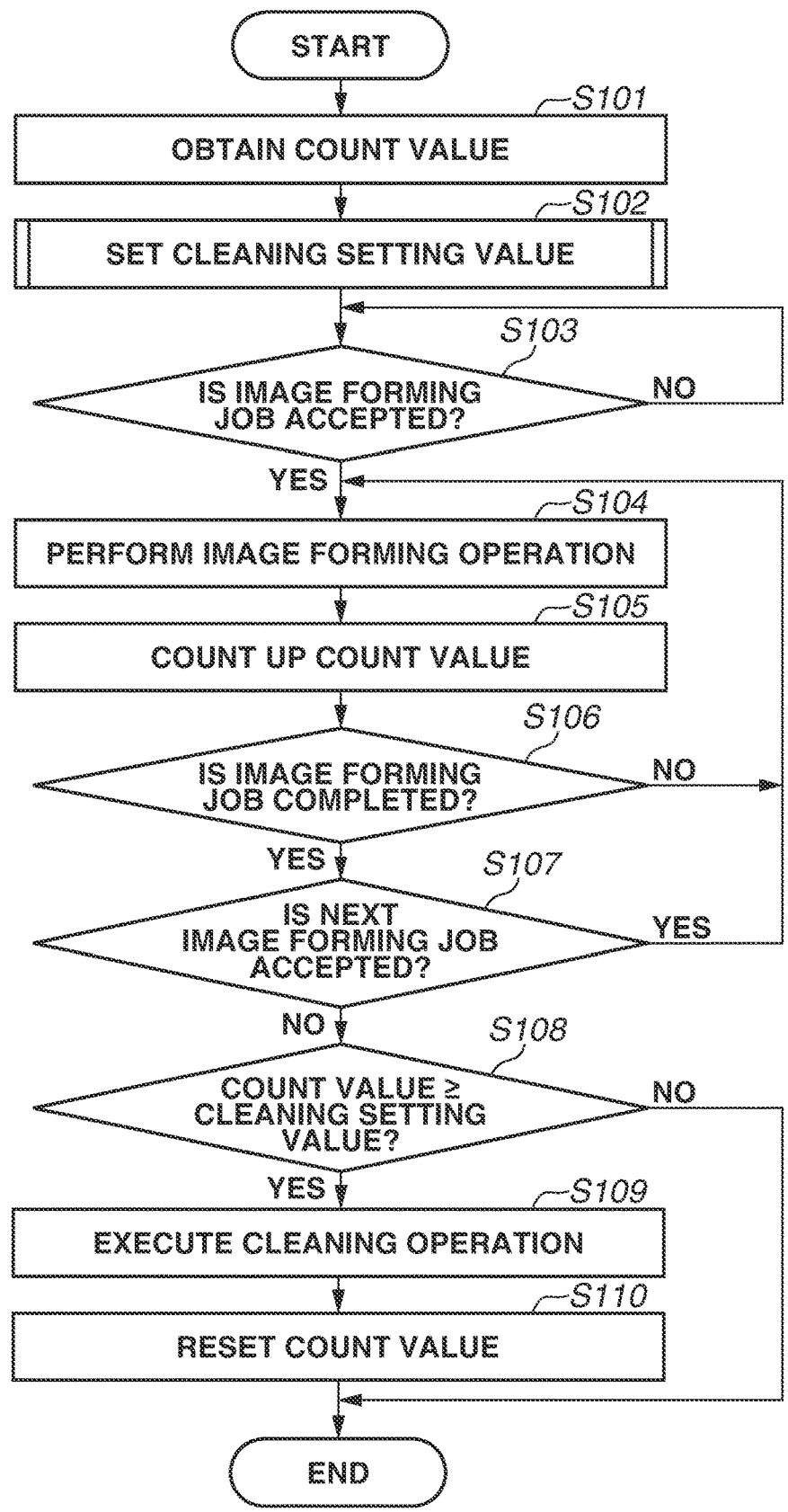
FIG. 8 is a flowchart illustrating a sequence during execution of image forming jobs according to the first exemplary embodiment.

FIGS. 7A to 7C are explanatory diagrams illustrating cases where a plurality of image forming jobs is accepted. FIG. 7A is an explanatory diagram illustrating the order of image forming operations by the image formation driving unit 90 when the IC controller 73 simultaneously accepts jobs 1 and 2.

If a plurality of image forming jobs, i.e., jobs 1 and 2, is simultaneously accepted, the image formation driving unit 90 initially executes an image forming operation for job 1. Here, the image formation driving unit 90 keeps job 2 on standby, and executes an image forming operation for job 2 after the image forming operation for job 1 is finished.

FIG. 7B is an explanatory diagram for a case where job 2 is accepted during execution of job 1. If job 2 is thus accepted during the execution of job 1, the image formation driving unit 90 keeps job 2 on standby until the image forming operation for job 1 is finished. The image formation driving unit 90 then executes the image forming operation for job 2 after the image forming operation for job 1 is finished.

FIGS. 7A and 7B are operation explanatory diagrams of consecutive jobs, i.e., a plurality (a predetermined number equal to or more than two) of consecutive image forming jobs. FIG. 7C is an operation explanatory diagram of intermittent jobs, i.e., a plurality of non-consecutive image forming jobs.

As illustrated in FIG. 7C, if job 1 is accepted and then the image forming operation for job 1 is executed and finished, the image formation driving unit 90 stops operation or enters a standby state. If job 2 is accepted after the end of the image forming operation for job 1 and the image forming apparatus 1 is in the standby state, the image formation driving unit 90 performs an image forming operation for job 2 upon accepting job 2 without keeping job 2 on standby.

The user interface 71 is configured to accept operations made by the operator via the touch panel based on display on the display panel. Specifically, the operator can set the execution timing of image forming operations and the execution timing of cleaning using the touch panel via the user interface 71. The execution timing of a cleaning operation is determined based on a cleaning setting value that is set by the operator via the user interface 71 and stored in the RAM 501 (or an initial value of the cleaning setting value stored in the RAM 501 in advance).

The IC controller 73 outputs an image formation signal equal in number to the number of times of image formation performed by the image forming sections 10 via the image formation driving unit 90 and the engine control unit 74. The counter 81 counts the image forming signals.

The counter 81 outputs the count value to the engine control unit 74. The engine control unit 74 stores the accepted count value into the RAM 501 as the cumulative number of image-formed sheets, i.e., the cumulative number of recording media on which image forming operation is executed.

The engine control unit 74 compares the count value counted by the counter 81 to the cleaning setting value stored in the RAM 501. If the count value is equal to or greater than the cleaning setting value stored in the RAM 501, the engine control unit 74 outputs a cleaning execution instruction to the cleaning control unit 75. If the cleaning processing is executed here, the engine control unit 74 resets the count value of the counter 81 to zero.

The IC controller 73 then drives the winding motor 55 to rotate by outputting a motor control signal to the winding motor 55 via the cleaning control unit 75. The IC controller 73 can thus operate the winding motor 55 via the cleaning control unit 75. During a cleaning operation, the IC controller 73 detects the driving current from the winding motor 55 via the current detection unit 79.

The winding motor 55 is controlled by a constant voltage. If the first cleaning holder 511 or the second cleaning holder 512 comes into contact with the first stopper 56a or the second stopper 56b, the driving current increases with the increasing load acting on the winding motor 55.

If the driving current detected by the current detection unit 79 exceeds a predetermined value, the IC controller 73 detects that the first cleaning holder 511 or the second cleaning holder 512 is in contact with the first stopper 56a or the second stopper 56b and a movement in one direction from one end to the other of the transparent members 42 is ended. In other words, the IC controller 73 detects that cleaning in one direction in a reciprocal operation is finished.

If the current detection unit 79 detects that the driving current has exceeded the predetermined value, the IC controller 73 therefore outputs a movement completion signal to the cleaning control unit 75. Upon receiving the movement completion signal, the cleaning control unit 75 stops the rotation of the winding motor 55.

The predetermined value is a value greater than that of the driving current flowing through the winding motor 55 when the first and second cleaning holders 511 and 512 are moving over the transparent members 42. In other words, the predetermined value is a value greater than that of the driving current flowing through the winding motor 55 before the first cleaning holder 511 or the second cleaning holder 512 comes into contact with the first stopper 56a or the second stopper 56b.

The predetermined value is set to a value such that the contact of the first cleaning holder 511 or the second cleaning holder 512 with the first stopper 56a or the second stopper 56b can be detected and that does not include the value of current that can increase due to other variations such as a motor failure.

It may be determined whether the first and second cleaning holders 511 and 512 have moved from one end to the other of the transparent members 42 in the longitudinal direction thereof by determining the amount of change in the detected current value instead of comparison with the predetermined value.

If the cleaning operation is determined to have been completed, the IC controller 73 stops the winding motor 55 via the engine control unit 74 and the cleaning control unit 75, and outputs a cleaning completion notification to the user interface 71. Based on the cleaning completion notification, the user interface 71 notifies the operator of the completion of the cleaning operation by displaying a screen indicating that the cleaning operation has been completed on the not-illustrated display unit. The user interface 71 may notify the user of the completion of the cleaning operation to the operator by producing a sound instead of displaying the screen on the display unit. If the notification is bothersome, the notification itself may be omitted.

On the other hand, if the cleaning operation is determined to have not been [0103 completed, the engine control unit 74 outputs a cleaning execution instruction to the cleaning control unit 75 again, and the IC controller 73 continues the cleaning operation by controlling the winding motor 55 via the cleaning control unit 75. The cleaning control unit 75 can control the first and second cleaning holders 511 and 512 to make a reciprocal operation by rotating the winding motor 55 forward and reversely.

In the present exemplary embodiment, the engine control unit 74, the cleaning control unit 75, the current detection unit 79, and the counter 81 are built in the IC controller 73. However, such a configuration is not restrictive. For example, modules different from the built-in modules of the IC controller 73 described in the present exemplary embodiment may be used to perform the controls of the IC controller 73 during the cleaning operation. Various controls may be performed by a controller including a built-in ROM 500 and RAM 501.

The image formation driving unit 90 outputs the image formation signal to the counter 81 once when image formation is performed on one side of a sheet, and twice in total when image formation is performed on both sides of a sheet. The counter 81 increases the count value by one each time the image formation signal is received.

Next, the controls during execution of image forming jobs by the IC controller 73 according to the present exemplary embodiment will be described with reference to the flowcharts of FIGS. 8 and 9.

In step S101, the IC controller 73 obtains the count value counted by the counter 81 from the RAM 501. In step S102, the IC controller 73 sets a cleaning setting value.

Figure 9:
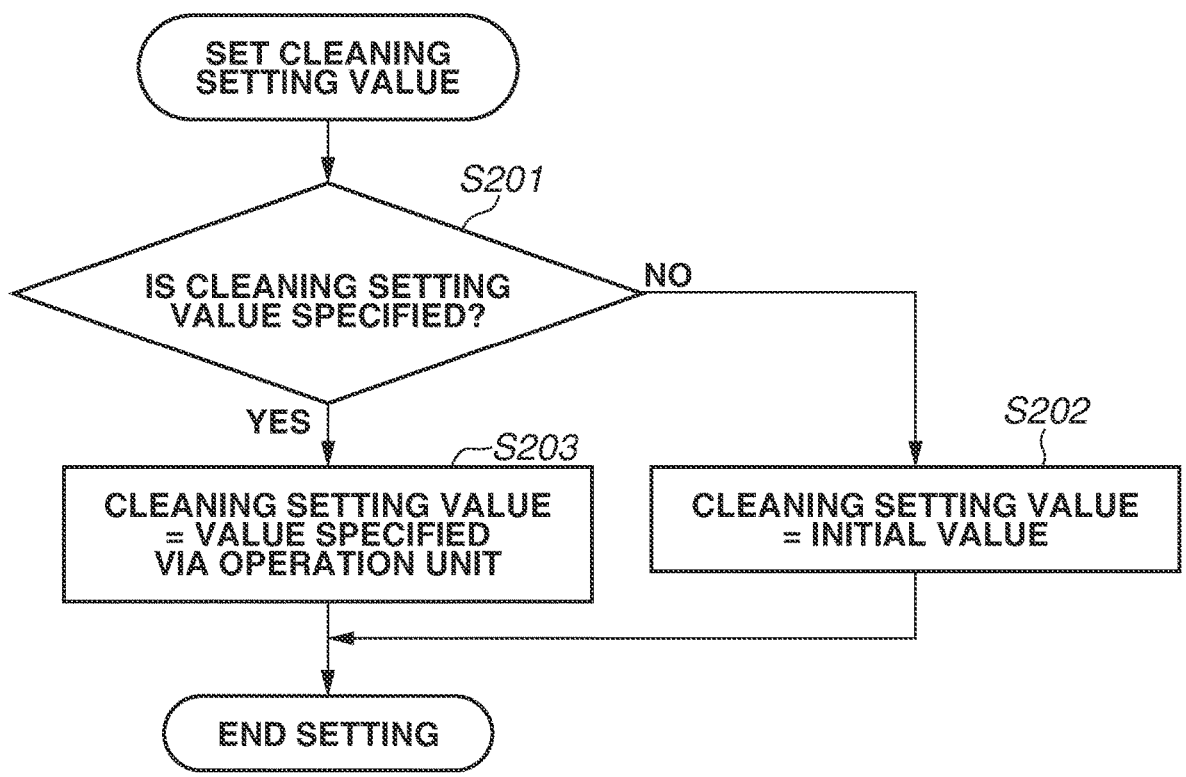
FIG. 9 is a flowchart illustrating processing for setting a cleaning setting value.

FIG. 9 is a flowchart illustrating a method for setting the cleaning setting value that is a set number of sheets for cleaning. In step S201, the IC controller 73 determines whether a cleaning setting value is specified by the operator via the operation unit 304. If no cleaning setting value is specified (NO in step S201), the processing proceeds to step S202. In step S202, the IC controller 73 sets the cleaning setting value to an initial value and stores (accumulates) the cleaning setting value in the RAM 501. For example, the initial value is set to a value of 1000.

On the other hand, if a cleaning setting value is set by the operator (YES in step S201), the processing proceeds to step S203. In step S203, the IC controller 73 stores the value specified via the operation unit 304 into the RAM 501. The processing of FIG. 9 is ended.

In step S103, the IC controller 703 determines whether an image forming job is accepted from the operator via the operation unit 304. If, in step S103, no image forming job is determined to have been accepted (NO in step S103), the processing returns to step S103. If an image forming job has been accepted (YES in step S103), the processing proceeds to step S104. The determination here is made based on whether an image forming job is stored (accumulated) in the RAM 501.

In step S104, the IC controller 73 performs an image forming operation corresponding to the image forming job accepted in step S103. In step S105, the counter 81 counts up the count value. The IC controller 73 stores the count value counted up by the counter 81 into the RAM 501.

In step S106, the IC controller 73 determines whether the image forming job accepted in step S103 has been completed. If the image forming job has not been completed (NO in step S106), the processing returns to step S104. In step S104, the IC controller 73 continues image formation on a sheet. If the image forming job has been completed (YES in step S106), the processing proceeds to step S107. In step S107, the IC controller 73 determines whether a next image forming job has been accepted.

In step S107, the IC controller 73 determines whether there is a next image forming job in the RAM 501, or whether a next image forming job has been accepted via the user interface 71. In other words, the IC controller 73 determines whether there are consecutive image forming jobs.

If there is a next image forming job accepted (YES in step S107), the processing returns to step S104. Steps S104 and S105 are repeated until the next image forming job is completed. If there is no next image forming job accepted (NO in step S107), the processing proceeds to step S108. In step S108, the IC controller 73 determines whether the count value stored in the RAM 501 is equal to or greater than the cleaning setting value stored in the RAM 501.

If the count value is less than the cleaning setting value (NO in step S108), the processing of FIG. 8 is ended. If the count value is equal to or greater than the cleaning setting value (YES in step S108), the processing proceeds to step S109. In step S109, the IC controller 73 executes the cleaning operation. A case where an image forming job is completed (YES in step S106), there is no next image forming job accepted (NO in step S107), and the count value (cumulative number of image-formed sheets) stored in the RAM 501 is equal to or greater than the cleaning setting value (predetermined number of sheets) stored in the RAM 501 (YES in step S108) is an example of a predetermined condition.

In step S110, the IC controller 73 resets the count value of the counter 81 stored in the RAM 501 in response to the execution of the foregoing cleaning operation. The flowchart of FIG. 8 is ended. In the present exemplary embodiment, the count value of the counter 81 is reset to zero. However, such a value is not restrictive as long as the count value is reduced after the cleaning operation.

Figure 10:
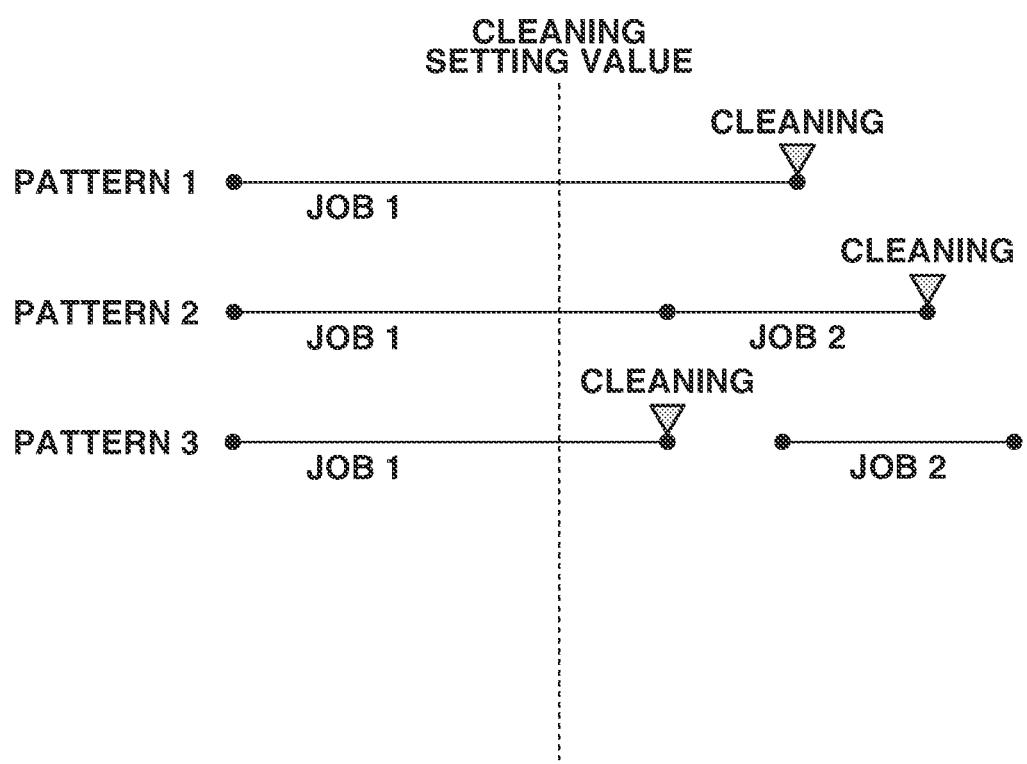
FIG. 10 is an explanatory diagram illustrating cleaning execution timing.

Now, the timing of execution of the cleaning operation will be described with reference to FIG. 10. Pattern 1 illustrated in FIG. 10 represents a case where there are no consecutive image forming jobs. In the present exemplary embodiment, an image forming operation is performed until job 1 is completed, even if the cumulative number of image-formed sheets exceeds the cleaning setting value. The cleaning operation is executed when job 1 is finished. "Completion of the image forming operation" in job 1 refers to a state where the entire image formation related to the accepted job 1 is finished. The "completion of the image forming operation" may also refer to a state where the image-formed sheet is not discharged to outside the image forming apparatus 1 as long as at least the formation of electrostatic latent images on the photosensitive members 100 by the optical scanning device 40 is finished.

Pattern 2 represents a state where there is a plurality of consecutive image forming jobs. If there is a plurality of consecutive image forming jobs (jobs 1 and 2) and the cumulative number of image-formed sheets exceeds the cleaning setting value, the image forming operation is continued until all the image forming jobs (here, jobs 1 and 2) are finished. The cleaning operation is executed after the end of all the image forming jobs (here, job 2).

Pattern 3 represents a state where there is a plurality of non-consecutive image forming jobs. If there is an interval of time between the end of job 1 and the acceptance of job 2 (job 2 is not accepted by the end of job 1), the cleaning operation is executed when the image forming operation of job 1 is finished.

As described above, in the present exemplary embodiment, the cleaning operation is not executed if there are consecutive image forming jobs. This can prevent a user from being kept waiting and also can prevent the occurrence of downtime due to the suspension of an image forming job. The usability can thereby be improved, compared to the case where an image forming job is suspended to execute the cleaning operation when the number of image-formed sheets reaches the cleaning setting value.

Next, a second exemplary embodiment will be described. The second exemplary embodiment differs from the first exemplary embodiment in that a determination regarding how many times the execution of the cleaning operation is postponed is made if a plurality of image forming jobs is accepted. A control configuration according to the present exemplary embodiment is similar to the configuration illustrated in FIG. 6. A description thereof will thus be omitted.

Figure 11:
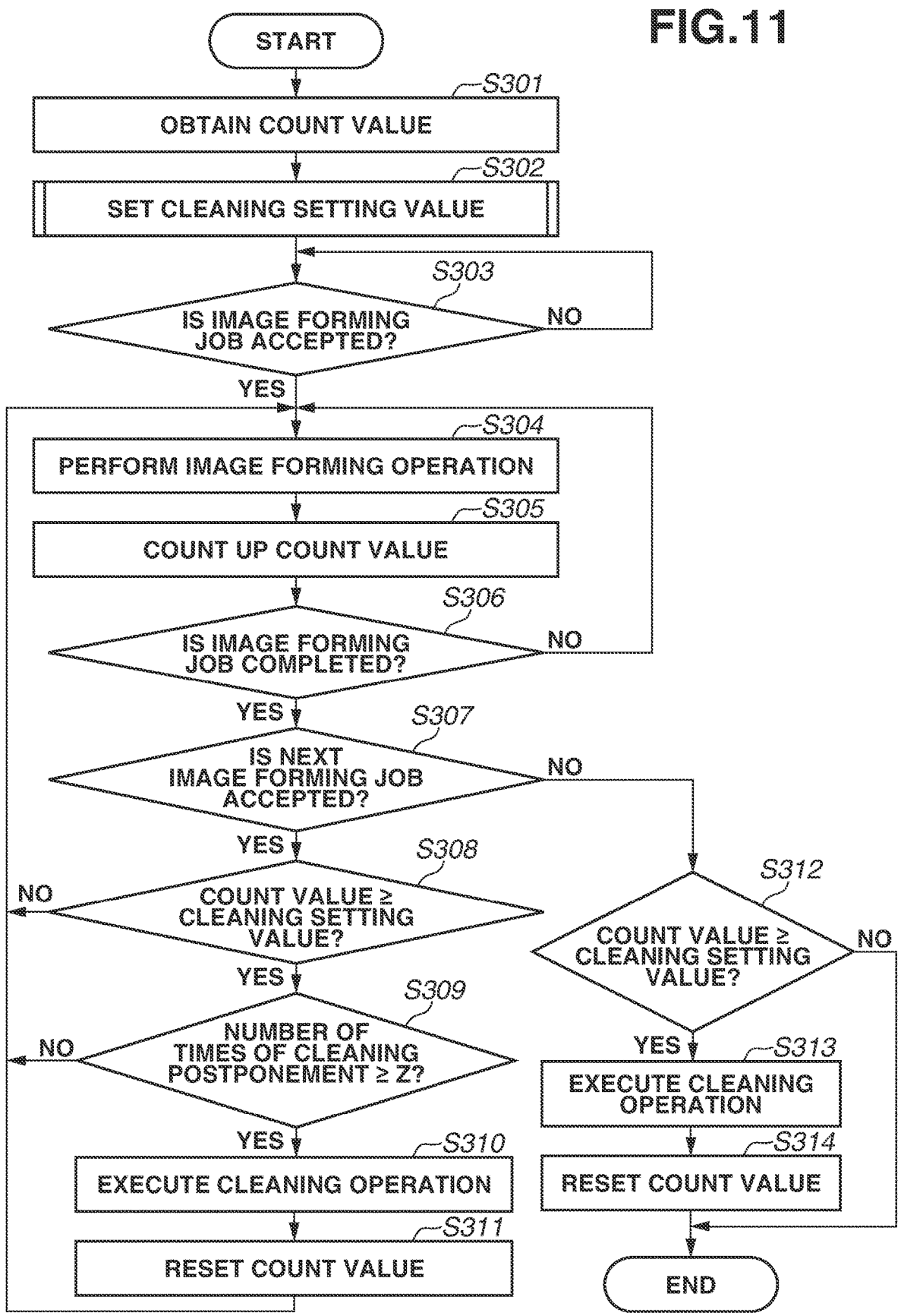
FIG. 11 is a flowchart illustrating a sequence during execution of image forming jobs according to a second exemplary embodiment.

A cleaning operation during execution of image forming jobs according to the second exemplary embodiment will be described below with reference to FIG. 11. In the following description, similar configurations to those of the first exemplary embodiment are designated by the same reference numerals. A description thereof will be omitted.

In step S301, the IC controller 73 obtains the count value counted by the counter 81 from the RAM 501. In step S302, the IC controller 73 sets the cleaning setting value. The setting of the cleaning setting value in step S302 is performed by a similar method to the control method illustrated in FIG. 9. A description thereof will thus be omitted.

In step S303, the IC controller 73 determines whether an image forming job has been accepted from the operator via the operation unit 304. If, in step S303, no image forming job is determined to have been accepted (NO in step S303), the processing returns to step S303. If there is an image forming job (YES in step S303), the processing proceeds to step S304. The determination here is made based on whether an image forming job is stored (accumulated) in the RAM 501.

In step S304, the IC controller 73 performs an image forming operation corresponding to the image forming job accepted in step S303. In step S305, the counter 81 counts up the count value. The IC controller 73 stores the count value counted up by the counter 81 into the RAM 501.

In step S306, the IC controller 73 determines whether the image forming job accepted in step S303 has been completed. If the image forming job has not been completed (NO in step S306), the processing returns to step S304. In step S304, the IC controller 73 continues image formation on a sheet. If the image forming job has been completed (YES in step S306), the processing proceeds to step S307. In step S307, the IC controller 73 determines whether a next image forming job has been accepted.

In step S307, the IC controller 73 determines whether there is a next image forming job in the RAM 501, or whether a next image forming job has been accepted via the user interface 71. That is, the IC controller 73 determines whether there are consecutive image forming jobs.

If there is a next image forming job accepted (YES in step S307), the processing proceeds to step S308. In step S308, the IC controller 73 determines whether the count value stored in the RAM 501 is equal to or greater than the cleaning setting value stored in the RAM 501. If the count value is less than the cleaning setting value (NO in step S308), the processing returns to step S304. In step S304, the IC controller 73 executes the next image forming job.

If the count value is equal to or greater than the cleaning setting value (YES in step S308), the processing proceeds to step S309. In step S309, the IC controller 73 determines whether the number of times the cleaning operation is postponed (the number of times of cleaning postponement) is equal to or greater than Z. Here, the "number of times the cleaning operation is postponed" refers to the number of times that the count value is equal to or greater than the cleaning setting value (YES in step S308) and then the processing proceeds to NO in step S309 in the flowchart of FIG. 11. In the present exemplary embodiment, Z is set to 3. If the number of times of cleaning postponement is greater than or equal to three, the IC controller 73 executes the cleaning operation despite the acceptance of the next image forming job. Z may be a value other than 3, and may be set by the operator.

If the number of times the cleaning operation is postponed is not equal to or greater than Z (NO in step S309), the IC controller 73 adds 1 to the number of times of cleaning postponement and the processing returns to step S304. If the number of times the cleaning operation is postponed is equal to or greater than Z (YES in step S309), the processing proceeds to step S310. In step S310, the IC controller 73 executes the cleaning operation. In step S311, the IC controller 73 resets the count value of the counter 81 stored in the RAM 501 in association with the execution of the foregoing cleaning operation. The processing returns to step S304. Processing in steps S304 and S305 is repeated until the next image forming job is completed. The case where an image forming job has been completed (YES in step S306), there is no image forming job accepted (NO in step S307), the count value (cumulative number of image-formed sheets) stored in the RAM 501 is equal to or greater than the cleaning setting value (predetermined number of sheets) stored in the RAM 501 (YES in step S308), and the number of times the cleaning operation is postponed is equal to or greater than Z (YES in step S309) is an example of a predetermined condition.

If there is no next image forming job accepted (NO in step S307), the processing proceeds to step S312. In step S312, the IC controller 73 determines whether the count value stored in the RAM 501 is equal to or greater than the cleaning setting value stored in the RAM 501. If the count value is less than the cleaning setting value (NO in step S312), the flowchart of FIG. 11 is ended. If the count value is equal to or greater than the cleaning setting value (YES in step S312), the processing proceeds to step S313. In step S313, the IC controller 73 executes the cleaning operation. In step S314, the IC controller 73 resets the count value. The flowchart of FIG. 11 is ended.

As described above, in the present exemplary embodiment, the cleaning operation is not executed if there are consecutive image forming jobs. This can prevent a user from being kept waiting and also can prevent the occurrence of downtime due to the suspension of an image forming job. The usability can thereby be improved, compared to the case where an image forming job is suspended to execute the cleaning operation when the number of image-formed sheets reaches the cleaning setting value.

In the present exemplary embodiment, there is a restriction on the number of times the cleaning operation is postponed. This can suppress image defects due to accumulation of foreign substances on the transparent members 42 by continual postponement of cleaning. Even in such a case, the cleaning operation can be postponed up to several times. The suspension of image forming jobs by the cleaning operation can thus be prevented compared to heretofore, and the usability can be improved.

Next, a third exemplary embodiment will be described. The third exemplary embodiment differs from the first exemplary embodiment in that if a plurality of image forming jobs is accepted, a determination regarding whether the accepted image forming jobs are of the same user is made.

A cleaning operation during execution of image forming jobs according to the third exemplary embodiment will be described below with reference to FIGS. 12 and 13. In the following description, similar components to those of the first exemplary embodiment are designated by the same reference numerals. A description thereof will be omitted.

Figure 12:
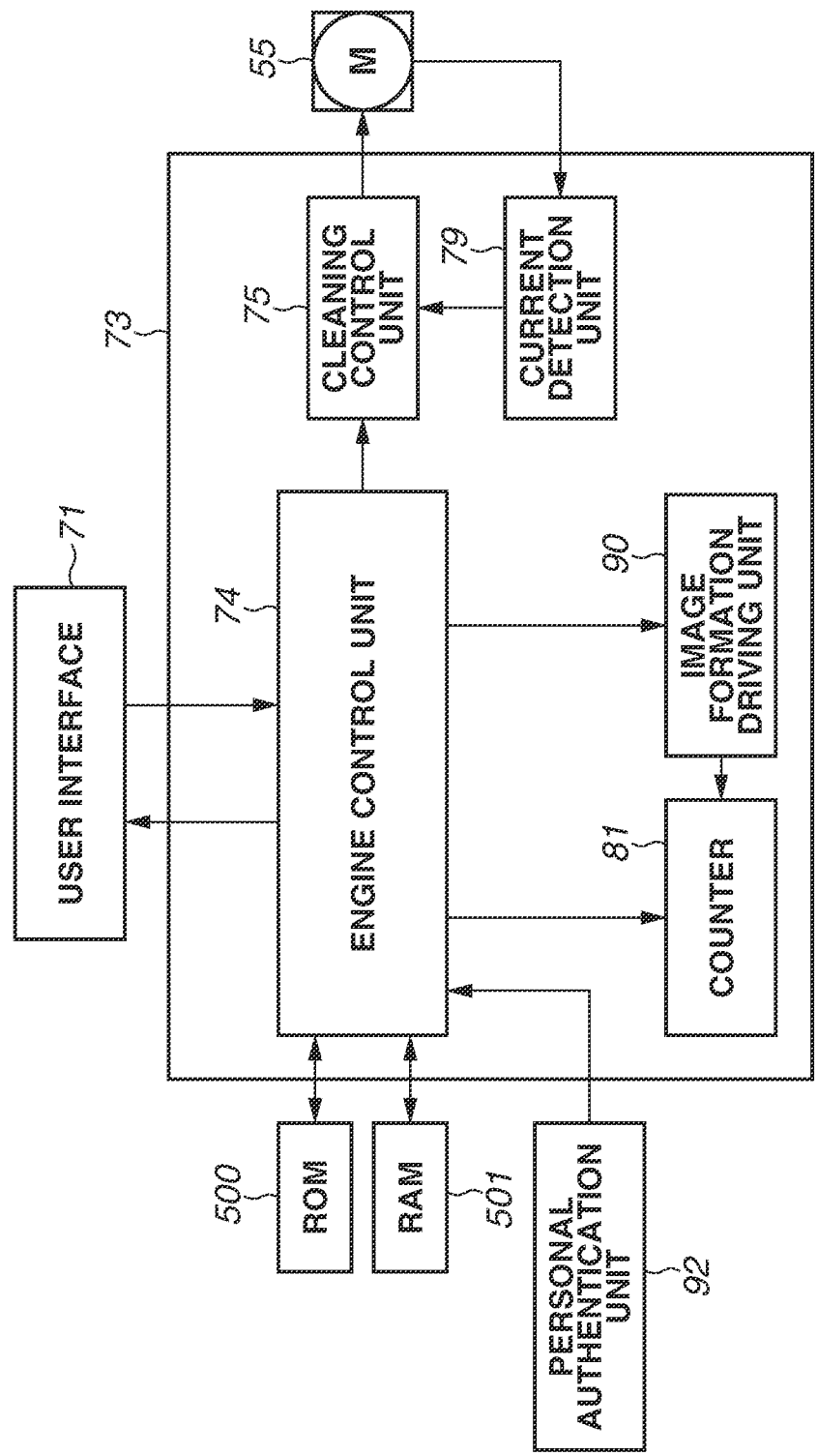
FIG. 12 is a control block diagram according to a third exemplary embodiment.

FIG. 12 is a control block diagram illustrating a control configuration for performing the cleaning operation during execution of image forming jobs according to the third exemplary embodiment. FIG. 13 is a flowchart illustrating a sequence during the execution of image forming jobs according to the third exemplary embodiment.

As described above, in FIG. 12, a difference from the first exemplary embodiment is that a personal authentication unit 92 is added. The personal authentication unit 92 refers to an IC card reader that obtains personal authentication data from the user's identification (ID) card. The personal authentication unit 92 is an example of an authentication data acquisition unit.

If the IC controller 73 accepts the personal authentication data from the user via the personal authentication unit 92, the IC controller 73 stores the personal authentication data and the content of an image forming job into the RAM 501 in association with each other.

In the present exemplary embodiment, the IC card reader is described as an example of the personal authentication unit 92. However, the personal authentication unit 92 may be one that obtains a user ID accepted from the user via the user interface 71 as personal authentication data. If an image forming job is accepted via a not-illustrated network line, an ID number of the accepted user may be stored in the RAM 501 as personal authentication data in association with the image forming job.

The IC controller 73 determines whether image forming jobs stored in the RAM 501 are of the same user based on whether the pieces of personal authentication data are the same.

For a further improvement in usability, in the present exemplary embodiment, the execution timing of the cleaning operation is determined based on whether the pieces of personal authentication data are the same. The reason is that if a plurality of image forming jobs is accepted from the same user, the user is likely to be waiting for recording media to be output in front of the image forming apparatus 1, and executing the cleaning operation after the end of an image forming job in spite of the waiting user can lower the usability.

The present exemplary embodiment is then configured not to execute the cleaning operation if a plurality of image forming jobs associated with the same personal authentication data is accepted and the count value reaches or exceeds the cleaning setting value. This can prevent the occurrence of downtime from the execution of the cleaning operation when the user is likely to be waiting in front of the image forming apparatus 1.

In the present exemplary embodiment, if a plurality of image forming jobs is accepted from different users and the count value reaches or exceeds the cleaning setting value, the cleaning operation is executed after the end of an image forming job or image forming jobs from the same user. Such a configuration can prevent foreign substances on the transparent members 42 from being left unremoved due to the inexecution of the cleaning operation.

A control during the execution of image forming jobs by the IC controller 73 according to the present exemplary embodiment will be described below with reference to the flowchart of FIG. 13.

In step S401, the IC controller 73 obtains the count value counted by the counter 81 from the RAM 501. In step S402, the IC controller 73 sets the cleaning setting value. The setting of the cleaning setting value in step S402 is performed by a similar method to the control method illustrated in FIG. 9. A description thereof will thus be omitted.

In step S403, the IC controller 73 determines whether an image forming job has been accepted from an operator via the operation unit 304. If, in step S403, no image forming job is determined to have been accepted (NO in step S403), the processing returns to step S403. If there is an image forming job (YES in step S403), the processing proceeds to step S404. The determination here is made based whether an image forming job is stored in the RAM 501.

In step S404, the IC controller 73 perform an image forming operation corresponding to the image forming job accepted in step S403. In step S405, the counter 81 counts up the count value. The IC controller 73 stores the count value counted up by the counter 81 into the RAM 501.

In step S406, the IC controller 73 determines whether the image forming job accepted in step S403 has been completed. If the image forming job has not been completed (NO in step S406), the processing returns to step S404. In step S404, the IC controller 73 continues image formation on a sheet. If the image forming job has been completed (YES in step S406), the processing proceeds to step S407. In step S407, the IC controller 73 determines whether a next image forming job has been accepted.

In step S407, the IC controller 73 determines whether there is a next image forming job in the RAM 501, or whether a next image forming job has been accepted via the user interface 71. That is, the IC controller 73 determines whether there are consecutive image forming jobs.

If there is a next image forming job accepted (YES in step S407), the processing proceeds to step S408. In step S408, the IC controller 73 determines whether the image forming job completed in step S406 and the next image forming job are accepted from the same user. If there is no next image forming job accepted (NO in step S407), the processing proceeds to step S409.

If the image forming job completed in step S406 and the next image forming job are accepted from the same user (YES in step S408), the processing returns to step S404. The processing in steps S404 and S405 is repeated until the next image forming job is completed.

If the image forming job completed in step S406 and the next image forming job are not accepted from the same user (NO in step S408), the processing proceeds to step S409.

In step S409, the IC controller 73 determines whether the count value stored in the RAM 501 is equal to or greater than the cleaning setting value stored in the RAM 501.

Figure 13:
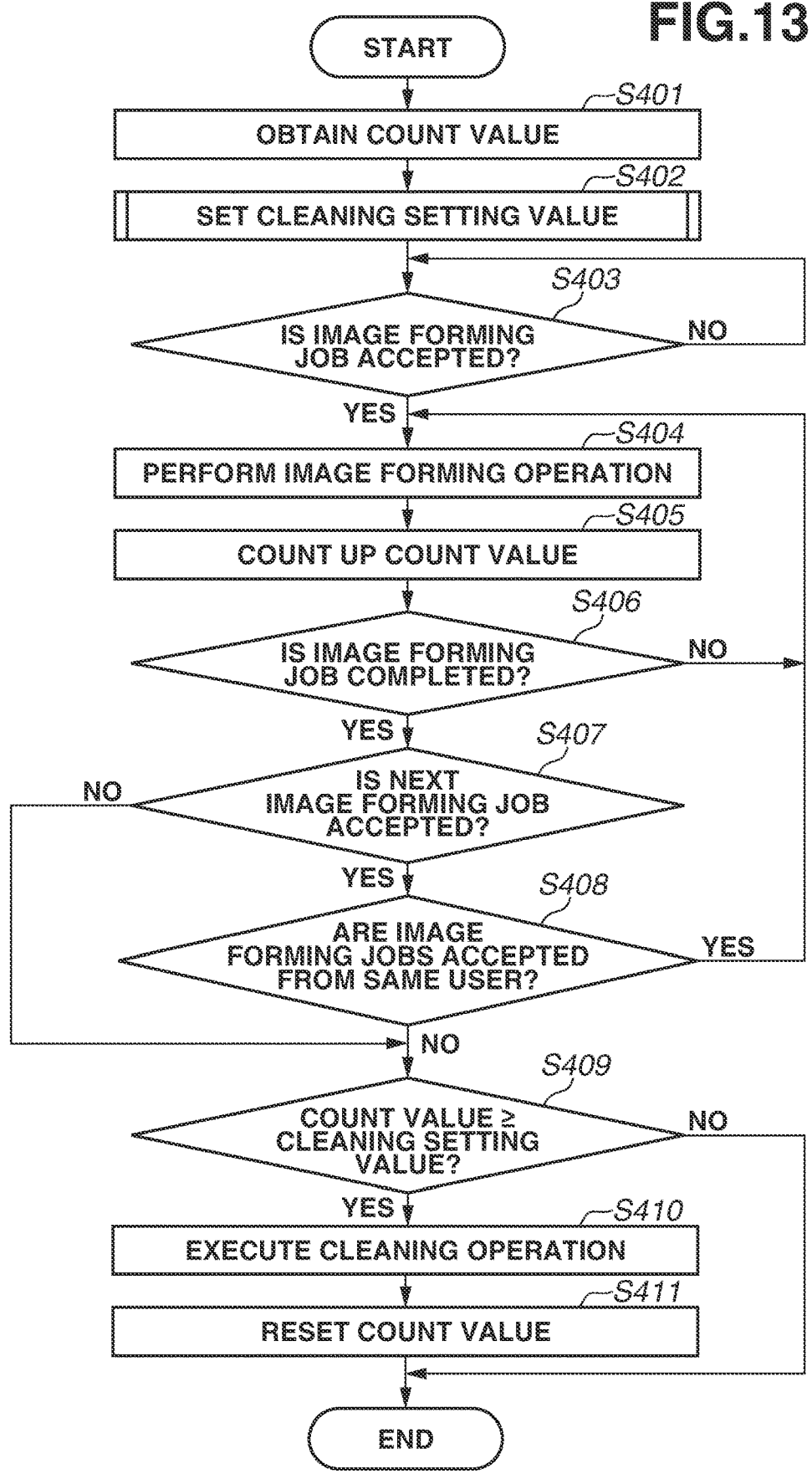
FIG. 13 is a flowchart illustrating a sequence during execution of image forming jobs according to the third exemplary embodiment.

If the count value is less than the cleaning setting value (NO in step S409), the processing of FIG. 13 is ended. If the count value is equal to or greater than the cleaning setting value (YES in step S409), the processing proceeds to step S410. In step S410, the IC controller 73 executes the cleaning operation. The case where an image forming job has been completed (YES in step S406), there is a next image forming job accepted (YES in step S407), the completed image forming job and the next image forming job are accepted from the same user (YES in step S408), and the count value (cumulative number of image-formed sheets) stored in the RAM 501 is equal to or greater than the cleaning setting value (predetermined number of sheets) stored in the RAM 501 (YES in step S409) is an example of a predetermined condition.

In step S411, the IC controller 73 resets the count value of the counter 81 stored in the RAM 501 in association with the execution of the foregoing cleaning operation. The flowchart of FIG. 13 is ended.

In the present exemplary embodiment, the count value of the counter 81 is reset to 0. However, such a value is not restrictive as long as the count value is reduced after the cleaning operation.

As described above, in the present exemplary embodiment, the cleaning operation is not executed if consecutive image forming jobs are accepted from the same user. This can prevent a user from being kept waiting and also can prevent the occurrence of downtime due to the suspension of an image forming job. If consecutive image forming jobs are accepted from a plurality of different users, the cleaning operation is executed after the end of an image forming job or image forming jobs accepted from one user (same user). The usability can thereby be improved, compared to the case where an image forming job is suspended to execute the cleaning operation when the number of image-formed sheets reaches the cleaning setting value. Accumulation of foreign substances on the transparent members 42 due to the inexecution of the cleaning operation can also be prevented.

Next, a fourth exemplary embodiment will be described. The fourth exemplary embodiment differs from the third exemplary embodiment in that a determination regarding how many times the execution of the cleaning operation is postponed is made if a plurality of image forming jobs is accepted. Since the control configuration is similar to that of FIG. 12, a description thereof will be omitted.

Figure 14:
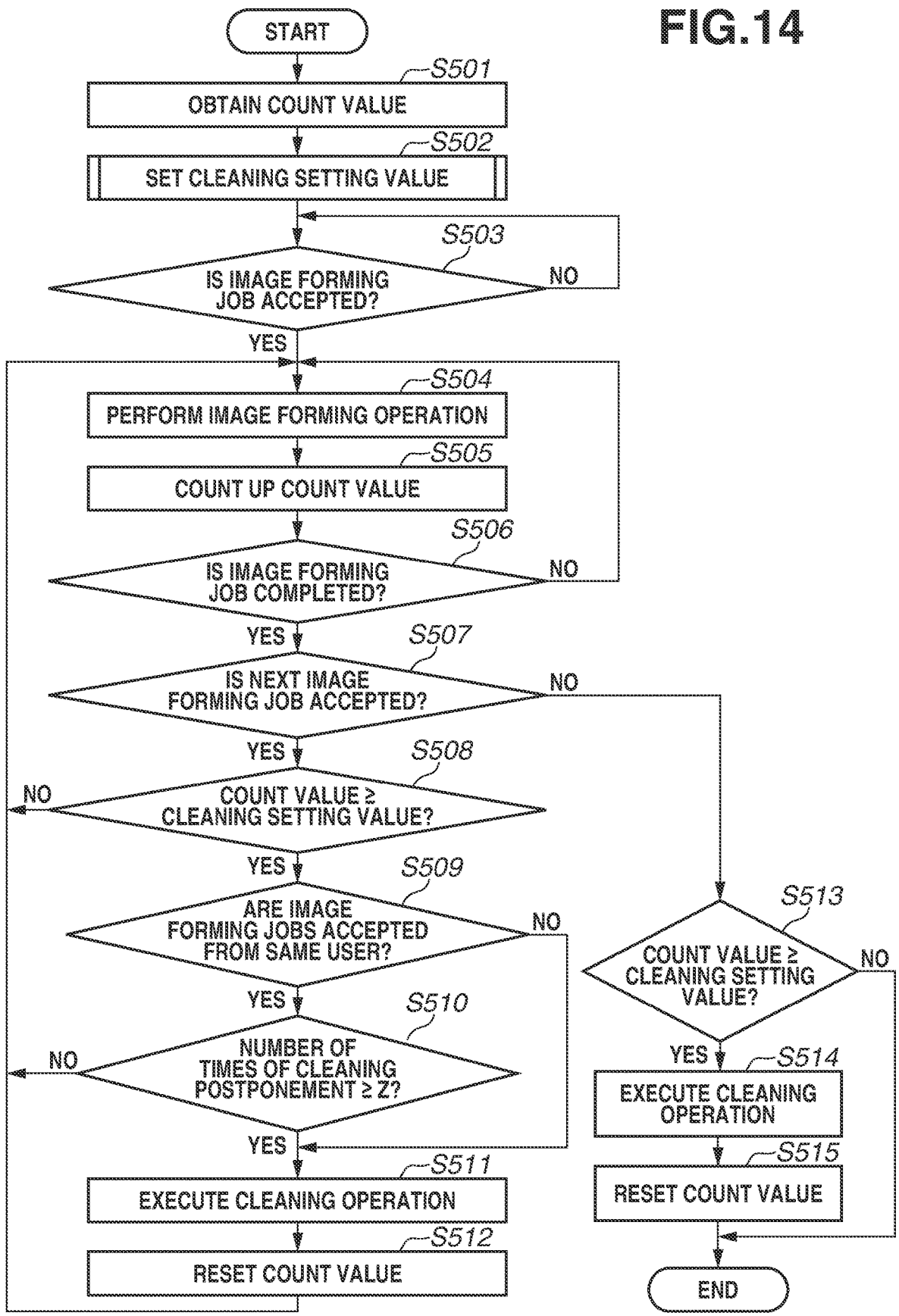
FIG. 14 is a flowchart illustrating a sequence during execution of image forming jobs according to a fourth exemplary embodiment.

The cleaning operation during execution of image forming jobs according to the fourth exemplary embodiment will be described below with reference to FIG. 14. In the following description, similar configurations to those of the first exemplary embodiment are designated by the same reference numerals. A description thereof will be omitted.

In step S501, the IC controller 73 obtains the count value counted by the counter 81 from the RAM 501. In step S502, the IC controller 73 sets the cleaning setting value. The setting of the cleaning setting value in step S502 is performed by a similar method to the control method illustrated in FIG. 9. Since details of the method are similar to the foregoing, a description thereof will be omitted.

In step S503, the IC controller 73 determines whether an image forming job has been accepted from an operator via the operation unit 304. If, in step S503, no image forming job is determined to have been accepted (NO in step S503), the processing returns to step S503. If there is an image forming job (YES in step S503), the processing proceeds to step S504. The determination here is made based on whether an image forming job is stored (accumulated) in the RAM 501.

In step S504, the IC controller 73 performs an image forming operation corresponding to the image forming job accepted in step S503. In step S505, the counter 81 counts up the count value. The IC controller 73 stores the count value counted up by the counter 81 into the RAM 501.

In step S506, the IC controller 73 determines whether the image forming job accepted in step S503 has been completed. If the image forming job has not been completed (NO in step S506), the processing returns to step S504. In steps S504 and S505, the IC controller 73 continues image formation on a sheet. If the image forming job has been completed (YES in step S506), the processing proceeds to step S507. In step S507, the IC controller 73 determines whether a next image forming job has been accepted.

In step S507, the IC controller 73 determines whether there is a next image forming job in the RAM 501, or whether a next image forming job has been accepted via the user interface 71. That is, the IC controller 73 determines whether there are consecutive image forming jobs.

If there is a next image forming job (YES in step S507), the processing proceeds to step S508. In step S508, the IC controller 73 determines whether the count value stored in the RAM 501 is equal to or greater than the cleaning setting value stored in the RAM 501. If the count value is less than the cleaning setting value (NO in step S508), the processing returns to step S504. In step S504, the IC controller 73 executes the next image forming job.

If the count value is greater than or equal to the cleaning setting value (YES in step S508), the processing proceeds to step S509. In step S509, the IC controller 73 determines whether the image forming job completed in step S506 and the next image forming job are accepted from the same user.

If the image forming job completed in step S506 and the next image forming job are not accepted from the same user (NO in step S509), the processing proceeds to step S511.

If the image forming job completed in step S506 and the next image forming job are accepted from the same user (YES in step S509), the processing proceeds to step S510. In step S510, the IC controller 73 determines whether the number of times of cleaning postponement (number of times the cleaning operation is postponed) is equal to or greater than Z. In the present exemplary embodiment, Z is 3. If the number of times of cleaning postponement is equal to or greater than three, the IC controller 73 executes the cleaning operation despite the acceptance of the next image forming job. Z may be a value other than 3, and may be set by the operator.

If the number of times the cleaning operation is postponed is not greater than or equal to Z (NO in step S510), the IC controller 73 adds 1 to the number of times of cleaning postponement and the processing returns to step S504. If the number of times the cleaning operation is postponed is equal to or greater than Z (YES in step S510), the processing proceeds to step S511.

In step S511, the IC controller 73 executes the cleaning operation. In step S512, the IC controller 73 resets the count value of the counter 81 stored in the RAM 501 in association with the execution of the foregoing cleaning operation. The processing returns to step S504. The processing in steps S504 and S505 is repeated until the next image forming job is completed. The case where an image forming job has been completed (YES in step S506), there is a next image forming job accepted (YES in step S507), the count value (cumulative value of image-formed sheets) stored in the RAM 501 is equal to or greater than the cleaning setting value (predetermined number of sheets) stored in the RAM 501 (YES in step S508), the completed image forming job and the next image forming job are accepted from the same user (YES in step S509), and the number of times the cleaning operation is postponed is equal to or greater than Z (YES in step S510) is an example of a predetermined condition.

If there is no next image forming job accepted (NO in step S507), the processing proceeds to step S513. In step S513, the IC controller 73 determines whether the count value stored in the RAM 501 is equal to or greater than the cleaning setting value stored in the RAM 501. If the count value is less than the cleaning setting value (NO in step S513), the flowchart of FIG. 14 is ended. If the count value is equal to or greater than the cleaning setting value (YES in step S513), the processing proceeds to step S514. In step S514, the IC controller 73 executes the cleaning operation. In step S515, the IC controller 73 resets the count value. The flowchart of FIG. 14 is ended.

As described above, in the present exemplary embodiment, the cleaning operation is not executed if there are consecutive image forming jobs, the consecutive image forming jobs are accepted from the same user, and the number of times of cleaning postponement is not equal to or greater than Z. This can prevent a user from being kept waiting and can also prevent the occurrence of downtime due to the suspension of an image forming job. The usability can thereby be improved, compared to the case where an image forming job is suspended to execute the cleaning operation when the number of image-formed sheets reaches the cleaning setting value.

In the present exemplary embodiment, there is a restriction on the number of times the cleaning operation is postponed. This can suppress image defects due to accumulation of foreign substances on the transparent members 42 by continual postponement of cleaning. Even in such a case, the cleaning operation can be postponed up to several times. The suspension of image forming jobs by the cleaning operation can thus be prevented compared to heretofore, and the usability can be improved.

In the present exemplary embodiment, the cleaning operation is not executed if consecutive image forming jobs are accepted from the same user. This can prevent a user from being kept waiting and can also prevent the occurrence of downtime due to the suspension of an image forming job. If consecutive image forming jobs are accepted from a plurality of different users, the cleaning operation is executed after the end of an image forming job or image forming jobs accepted from one user (same user). The usability can thereby be improved, compared to the case where an image forming job is suspended to execute the cleaning operation when the number of image-formed sheets reaches the cleaning setting value. Accumulation of foreign substances on the transparent members 42 due to the inexecution of the cleaning operation can also be prevented.

Other Exemplary Embodiments

In the foregoing exemplary embodiments, the optical scanning device 40 is arranged below the image forming sections 10 in the direction perpendicular to the length direction of the image forming sections 10. However, the optical scanning device 40 may be arranged above the image forming sections 10 in the direction perpendicular to the length direction of the image forming sections 10. In such a configuration, since the transparent members 42a to 42d are arranged above the image forming sections 10, toner or paper dust will not fall from the image forming sections 10. However, scattered toner and paper dust can adhere to the transparent members 42a to 42d. Foreign substances such as toner and paper dust adhering to the transparent members 42a to 42d can therefore be removed by providing the cleaning mechanism 51 even in the configuration where the optical scanning device 40 is arranged above the image forming sections 10 in the direction perpendicular to the length direction of the image forming sections 10.

In the foregoing exemplary embodiments, the counter 81 is configured to increment the count value by one based on information about the number of image-formed sheets from the engine control unit 74. However, the counter 81 may be configured to decrement the count value by one based on the information about the number of image-formed sheets. In such a case, the counter 81 may be configured to start decrementing the count value at a set number of sheets for cleaning. The set number of sheets for cleaning may be set to "−1000". The IC controller 73 may determine whether the set number of sheets for cleaning is reached based on the absolute value of the count value counted by the counter 81.

Even with such a configuration, if the count value (number of image-formed sheets) reaches the set number of sheets for cleaning during execution of an image forming job, the image forming job is not suspended and the cleaning processing is executed after the image forming job is finished. This can prevent a drop in usability since the operator instructing the execution of the image forming job will not be kept waiting.

In the foregoing exemplary embodiments, image forming jobs are described to be accepted from an operator or operators via the operation unit 304. However, the foregoing exemplary embodiments are also applicable to a configuration in which image forming jobs are accepted from an external apparatus via a communication line. The image forming apparatus 1 can thus accept image forming jobs from operators in various ways. The use of the foregoing exemplary embodiments is considered to provide a particularly high effect of preventing a drop in usability for an operator who inputs image forming jobs via the operation unit 304. The reason is that the operator who inputs image forming jobs via the operation unit 304 is likely to wait the completion of the image forming jobs in front of the apparatus main body.

Similarly, suppose that an operator executes an image forming job for reading a document image by using the reader unit 306 and making a copy by using the image forming sections 10. Such an operator is also likely to wait in front of the apparatus main body until the image forming job is completed, and the use of the foregoing exemplary embodiments is considered to provide a particularly high effect. Moreover, the use of the foregoing exemplary embodiments is also considered to provide a particularly high effect in a configuration in which the image forming apparatus 1 includes a not-illustrated user authentication unit using a near field communication method. The reason is that operators make an authentication operation on the user authentication unit to execute image formation corresponding to transmitted jobs, and are thus likely to wait in front of the image forming apparatus 1 until the image forming jobs are completed.

As described above, according to the foregoing exemplary embodiments, a drop in the usability of an operator who runs an image forming job or image forming jobs on the image forming apparatus 1 can be prevented since the image forming job(s) of the operator is/are prevented from being suspended due to the cleaning operation of the optical scanning device 40.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-201325, filed Oct. 25, 2018, which is hereby incorporated by reference herein in its entirety.

What is claimed is:

1. An image forming apparatus configured to form an image on a recording medium based on an image forming job input to the image forming apparatus, the image forming apparatus comprising:
  an image forming unit including a photosensitive member and an optical scanning device, the optical scanning device, including a transparent member, configured to transmit laser light, for scanning the photosensitive member, through the transparent member to outside of the optical scanning device, the image forming unit being configured to form the image on the recording medium by developing with toner an electrostatic latent image formed on the photosensitive member by scanning of the laser light and transferring the developed toner image to the recording medium;
  a cleaning mechanism configured to clean the transparent member; and
  a control unit configured to control the cleaning mechanism such that the cleaning mechanism executes cleaning of the transparent member in response to a predetermined condition being satisfied and configured to control the image forming unit,
  wherein the control unit is configured to,
    in a case where a second image forming job subsequent to a first image forming job is received when an image forming operation based on the first image forming job is finished, control the cleaning mechanism not to execute a cleaning operation and control the image forming unit to start the image forming operation based on the second image forming job, and
    in a case where the second image forming job is not received when the image forming operation based on the first image forming job is finished, (1) control the cleaning mechanism to execute a cleaning operation after the image forming job based on the first image forming job is finished and before it is determined whether the second image forming job is received, in a case where a number of sheets on which an image is formed and which have been accumulated since the cleaning mechanism last executed the cleaning operation exceeds a predetermined number of sheets while the image forming operation based on the first image forming job is being executed, and (2) control the cleaning mechanism not to execute the cleaning operation and determine whether the second image forming job is received, in a case where the number of sheets on which an image is formed and which have been accumulated since the cleaning mechanism last executed the cleaning operation does not exceed the predetermined number of sheets while the image forming operation based on the first image forming job is being executed.

2. The image forming apparatus according to claim 1, further comprising an authentication data acquisition unit configured to obtain personal authentication data related to the input image forming job,
wherein personal authentication data related to the first image forming job obtained by the authentication data acquisition unit and the second image forming job obtained by the authentication data acquisition unit are the same.

3. The image forming apparatus according to claim 2, further comprising a storage unit configured to store the personal authentication data obtained by the authentication data acquisition unit and an input image forming job in association with each other.

4. The image forming apparatus according to claim 1, further comprising a counter configured to count the number of sheets on which an image is formed by the image forming unit and which have been accumulated since the cleaning mechanism last executed the cleaning operation,
wherein the control unit is configured to, if the cleaning mechanism is operated, reset a count value of the counter.

5. An image forming apparatus configured to form an image on a recording medium based on an image forming job input to the image forming apparatus, the image forming apparatus comprising:
an image forming unit including a photosensitive member and an optical scanning device, the optical scanning device, including a transparent member, configured to transmit laser light, for scanning the photosensitive member, through the transparent member to outside of the optical scanning device, the image forming unit being configured to form the image on the recording medium by developing with toner an electrostatic latent image formed on the photosensitive member by scanning of the laser light and transferring the developed toner image to the recording medium;
a cleaning mechanism configured to clean the transparent member; and
a control unit configured to control the cleaning mechanism such that the cleaning mechanism executes cleaning of the transparent member in response to a predetermined condition being satisfied,
wherein the control unit is configured to (1) control the cleaning mechanism to execute a cleaning operation before an image forming operation based on an image forming job subsequent to a predetermined number of consecutive image forming jobs is started after an image forming operation based on the predetermined number of consecutive image forming jobs following the image forming job is completed in a case where a number of sheets on which an image is formed and which have been accumulated since the cleaning mechanism last executed the cleaning operation exceeds a predetermined number of sheets while one of a plurality of input image forming jobs is being executed, and (2) control the image forming unit to start an image forming operation based on an image forming job subsequent to the plurality of image forming jobs without causing the cleaning mechanism to execute the cleaning operation after an image forming operation based on the plurality of image forming jobs is completed in a case where the number of sheets on which the image is formed and which have been accumulated since the cleaning mechanism last executed the cleaning operation does not exceed the predetermined number of sheets while the plurality of input image forming jobs is being executed.

6. The image forming apparatus according to claim 5, wherein the predetermined number of consecutive image forming jobs is three.

7. The image forming apparatus according to claim 5, further comprising an authentication data acquisition unit configured to obtain personal authentication data related to the input image forming job,
wherein personal authentication data related to the plurality of image forming jobs obtained by the authentication data acquisition unit is the same.

8. The image forming apparatus according to claim 7, further comprising a storage unit configured to store the personal authentication data obtained by the authentication data acquisition unit and the input image forming job in association with each other.

9. The image forming apparatus according to claim 5, further comprising a counter configured to count the number of sheets on which an image is formed by the image forming unit and which have been accumulated since the cleaning mechanism last executed the cleaning operation,
wherein the control unit is configured to, if the cleaning mechanism is operated, reset a count value of the counter.

* * * * *